(12) United States Patent
Cohen et al.

(10) Patent No.: US 9,487,110 B2
(45) Date of Patent: Nov. 8, 2016

(54) CAR SEAT

(71) Applicant: Yochanan Cohen, New York, NY (US)

(72) Inventors: Yochanan Cohen, New York, NY (US); Velissa Van Scoyoc, Pottstown, PA (US); Ahmet T. Becene, North Royalton, OH (US)

(73) Assignee: Pidyon Controls Inc., New York, NY (US)

( * ) Notice: Subject to any disclaimer, the term of this patent is extended or adjusted under 35 U.S.C. 154(b) by 56 days.

(21) Appl. No.: 14/197,855

(22) Filed: Mar. 5, 2014

(65) Prior Publication Data

US 2015/0251567 A1    Sep. 10, 2015

(51) Int. Cl.
*A47C 1/08* (2006.01)
*B60N 2/28* (2006.01)

(52) U.S. Cl.
CPC ............. *B60N 2/2806* (2013.01); *B60N 2/286* (2013.01); *B60N 2/2809* (2013.01); *B60N 2/2845* (2013.01); *B60N 2/2863* (2013.01); *B60N 2/2887* (2013.01); *B60N 2/2821* (2013.01); *B60N 2/2824* (2013.01); *B60N 2/2827* (2013.01); *B60N 2/2842* (2013.01)

(58) Field of Classification Search
CPC B60N 2/2821; B60N 2/2824; B60N 2/2827; B60N 2/2842
USPC .............. 297/256.16, 253, 256.15, 254, 256, 297/452.65, 250.1
See application file for complete search history.

(56) References Cited

U.S. PATENT DOCUMENTS

| | | |
|---|---|---|
| 2,911,652 A | 11/1959 | Ekman |
| 3,015,104 A | 1/1962 | Crosson et al. |
| 3,023,134 A | 2/1962 | Creswell et al. |
| 3,174,155 A | 3/1965 | Pitman |
| 3,186,004 A | 6/1965 | Carlini |
| 3,320,619 A | 5/1967 | Latsnik et al. |
| 3,479,666 A | 11/1969 | Webb |
| 3,577,562 A | 5/1971 | Holt |
| 3,818,508 A | 6/1974 | Lammers |

(Continued)

FOREIGN PATENT DOCUMENTS

| | | | |
|---|---|---|---|
| EP | 1953035 | 8/2008 | |
| JP | 1953035 A2 * | 8/2008 | ........... B60N 2/2821 |

OTHER PUBLICATIONS

U.S. Appl. No. 13/785,555, filed Mar. 5, 2013, Cohen et al.

(Continued)

*Primary Examiner* — Syed A Islam
(74) *Attorney, Agent, or Firm* — Gordon & Jacobson, P.C.

(57) ABSTRACT

Embodiments of a car seat include an outer protective shell, an inner seat, a suspension system connecting and permitting relative movement between the inner seat and the outer protective shell for shock isolation, and a harness adapted to hold an occupant to the inner seat and not attached to the outer protective shell. In an accident, regardless of the direction in which the seat is facing and regardless of whether the result is a sudden acceleration and/or deceleration, the inner seat will move inside the frame, and the suspension system will absorb some, much, or all of the energy. Energy not absorbed by the suspension system may be absorbed by the inner seat itself and/or an anchor system used to connect the car seat to a vehicle. The frame of the seat will remain structurally intact in almost all circumstances thereby protecting the occupant of the car seat.

15 Claims, 17 Drawing Sheets

(56) References Cited

U.S. PATENT DOCUMENTS

| | | |
|---|---|---|
| 3,906,546 A | 9/1975 | Gooding |
| 4,101,983 A | 7/1978 | Dera et al. |
| 4,106,124 A | 8/1978 | Green |
| 4,345,338 A | 8/1982 | Frieder, Jr. et al. |
| 4,484,364 A | 11/1984 | Mitchell et al. |
| 4,599,752 A | 7/1986 | Mitchell |
| 4,690,455 A * | 9/1987 | Bailey .................. B60N 2/3084 297/117 |
| 4,845,786 A | 7/1989 | Chiarella |
| 4,937,888 A | 7/1990 | Straus |
| 4,972,527 A | 11/1990 | Wallace |
| 5,018,220 A | 5/1991 | Lane et al. |
| 5,204,998 A | 4/1993 | Liu |
| 5,259,071 A | 11/1993 | Scott et al. |
| 5,409,294 A | 4/1995 | Czernakowski |
| 5,466,044 A | 11/1995 | Barley et al. |
| 5,475,878 A | 12/1995 | Dawn et al. |
| 5,611,596 A | 3/1997 | Barley et al. |
| 5,630,645 A | 5/1997 | Lumley et al. |
| 5,638,544 A | 6/1997 | Sump |
| 5,680,656 A | 10/1997 | Gath |
| 5,724,681 A | 3/1998 | Sykes |
| 5,845,968 A | 12/1998 | Lovie |
| 5,916,828 A | 6/1999 | Messner |
| 5,930,840 A | 8/1999 | Arai |
| 5,947,552 A | 9/1999 | Wilkins et al. |
| 5,951,102 A | 9/1999 | Poulson et al. |
| 5,956,777 A | 9/1999 | Popovich |
| 5,961,180 A | 10/1999 | Greger et al. |
| 5,997,086 A | 12/1999 | Gibson et al. |
| 5,997,098 A | 12/1999 | Coffeen |
| 6,017,088 A | 1/2000 | Stephens et al. |
| 6,027,163 A | 2/2000 | Longenecker |
| 6,032,297 A | 3/2000 | Barthold et al. |
| 6,048,028 A | 4/2000 | Bapst |
| 6,070,890 A | 6/2000 | Haut et al. |
| 6,079,780 A | 6/2000 | Bapst |
| 6,082,814 A | 7/2000 | Celestina-Krevh et al. |
| 6,139,101 A | 10/2000 | Berringer et al. |
| 6,155,638 A | 12/2000 | Bapst |
| 6,161,847 A | 12/2000 | Howell et al. |
| 6,170,910 B1 | 1/2001 | Bapst |
| 6,272,692 B1 | 8/2001 | Abraham |
| 6,319,138 B1 | 11/2001 | Fair et al. |
| 6,325,454 B1 | 12/2001 | Maier |
| 6,331,032 B1 | 12/2001 | Haut et al. |
| 6,367,875 B1 | 4/2002 | Bapst |
| 6,389,607 B1 | 5/2002 | Wood |
| 6,409,205 B1 | 6/2002 | Bapst et al. |
| 6,421,840 B1 | 7/2002 | Chen et al. |
| 6,428,099 B1 | 8/2002 | Kain |
| 6,431,647 B2 | 8/2002 | Yamazaki |
| 6,450,576 B1 | 9/2002 | Rhein et al. |
| 6,457,774 B2 | 10/2002 | Baloga |
| 6,471,298 B2 | 10/2002 | Carine et al. |
| 6,474,735 B1 | 11/2002 | Carnahan et al. |
| 6,513,827 B1 | 2/2003 | Barenbrug |
| 6,540,292 B2 | 4/2003 | Darling et al. |
| 6,540,579 B1 | 4/2003 | Gubitosi et al. |
| 6,561,915 B2 | 5/2003 | Kelly et al. |
| 6,623,074 B2 | 9/2003 | Asbach et al. |
| 6,626,489 B2 | 9/2003 | Geis et al. |
| 6,629,727 B2 | 10/2003 | Asbach et al. |
| 6,634,708 B2 | 10/2003 | Guenther |
| 6,666,505 B2 | 12/2003 | Greger et al. |
| 6,669,302 B2 | 12/2003 | Warner, Jr. et al. |
| 6,679,550 B2 | 1/2004 | Goor et al. |
| 6,695,412 B2 | 2/2004 | Barger et al. |
| 6,705,675 B1 | 3/2004 | Eastman et al. |
| 6,705,676 B1 | 3/2004 | Berringer et al. |
| 6,709,062 B2 | 3/2004 | Shah |
| 6,746,080 B2 | 6/2004 | Tsugimatsu et al. |
| 6,749,258 B1 | 6/2004 | Leikin |
| 6,764,133 B2 | 7/2004 | Osato |
| 6,796,610 B2 * | 9/2004 | Nakagawa ........... B60N 2/2821 188/371 |
| 6,811,217 B2 | 11/2004 | Kane et al. |
| 6,857,965 B2 | 2/2005 | Pook et al. |
| 6,877,801 B2 | 4/2005 | Asbach et al. |
| 6,877,802 B2 | 4/2005 | Christensen et al. |
| 6,877,809 B2 | 4/2005 | Tanaka et al. |
| 6,887,161 B2 | 5/2005 | Mahlstedt et al. |
| 6,896,575 B2 | 5/2005 | Fair et al. |
| 6,912,736 B2 | 7/2005 | Moeller et al. |
| 6,926,359 B2 | 8/2005 | Runk |
| 6,931,671 B2 | 8/2005 | Skiba |
| 6,932,709 B1 | 8/2005 | Gubitosi et al. |
| 7,017,921 B2 | 3/2006 | Eros |
| 7,044,548 B2 | 5/2006 | Mullen et al. |
| 7,044,549 B2 | 5/2006 | Maier et al. |
| 7,062,795 B2 | 6/2006 | Skiba et al. |
| 7,066,536 B2 | 6/2006 | Williams et al. |
| 7,188,897 B2 | 3/2007 | Patrizi et al. |
| 7,195,314 B2 | 3/2007 | Spence et al. |
| 7,201,444 B2 | 4/2007 | Schimmoller et al. |
| 7,207,628 B2 | 4/2007 | Eros |
| 7,234,771 B2 | 6/2007 | Nakhla |
| 7,244,165 B2 | 7/2007 | Gubitosi et al. |
| 7,246,855 B2 | 7/2007 | Langmaid et al. |
| 7,252,342 B2 | 8/2007 | Patrizi et al. |
| 7,270,373 B2 | 9/2007 | Sakumoto |
| 7,278,683 B2 | 10/2007 | Williams et al. |
| 7,278,684 B2 * | 10/2007 | Boyle .................. B60N 2/2806 297/250.1 |
| 7,322,648 B2 | 1/2008 | Nakagawa et al. |
| 7,325,871 B2 | 2/2008 | Gangadharan et al. |
| 7,325,872 B2 | 2/2008 | Basu et al. |
| 7,328,462 B1 | 2/2008 | Straus |
| 7,328,941 B2 | 2/2008 | Asbach et al. |
| 7,338,122 B2 | 3/2008 | Hei et al. |
| 7,370,912 B2 | 5/2008 | Williams et al. |
| 7,387,336 B2 | 6/2008 | Sakumoto |
| 7,438,644 B2 | 10/2008 | Gubitosi et al. |
| 7,445,228 B2 | 11/2008 | Henry |
| 7,445,559 B2 | 11/2008 | Kakuda |
| 7,452,031 B2 | 11/2008 | Woellert et al. |
| 7,455,353 B2 | 11/2008 | Favorito et al. |
| 7,467,824 B2 | 12/2008 | Nakhla et al. |
| 7,472,952 B2 | 1/2009 | Nakhla et al. |
| 7,472,955 B2 | 1/2009 | Crane et al. |
| 7,484,801 B2 | 2/2009 | Kassai et al. |
| 7,488,034 B2 | 2/2009 | Ohren et al. |
| 7,497,449 B2 | 3/2009 | Logger |
| 7,506,926 B2 | 3/2009 | Carine |
| 7,523,984 B2 | 4/2009 | Steininger |
| 7,536,731 B1 | 5/2009 | Feldman |
| 7,552,969 B2 | 6/2009 | Maciejczyk |
| 7,559,606 B2 | 7/2009 | Hei et al. |
| 7,597,396 B2 | 10/2009 | Longenecker et al. |
| 7,607,734 B2 | 10/2009 | Clapper et al. |
| 7,648,199 B2 | 1/2010 | Amesar et al. |
| RE41,121 E | 2/2010 | Asbach et al. |
| 7,676,854 B2 | 3/2010 | Berger et al. |
| 7,695,374 B2 | 4/2010 | Bellows et al. |
| 7,717,506 B2 | 5/2010 | Amesar et al. |
| 7,722,118 B2 | 5/2010 | Bapst et al. |
| 7,726,734 B2 | 6/2010 | Mahal et al. |
| 7,740,313 B1 | 6/2010 | Hei et al. |
| 7,765,621 B2 | 8/2010 | Lardeau |
| 7,765,622 B2 | 8/2010 | Wiles |
| 7,770,970 B2 | 8/2010 | Hei et al. |
| 7,770,971 B2 | 8/2010 | Bellows et al. |
| 7,798,500 B2 | 9/2010 | Den Boer |
| 7,798,571 B2 | 9/2010 | Billman et al. |
| 7,802,320 B2 | 9/2010 | Morgan |
| 7,802,321 B2 | 9/2010 | Boyd |
| 7,806,471 B2 | 10/2010 | Nishimoto |
| 7,806,472 B2 | 10/2010 | Runk et al. |
| 7,810,682 B2 | 10/2010 | Balensiefer et al. |
| 7,832,023 B2 | 11/2010 | Crisco |
| 7,837,275 B2 | 11/2010 | Woellert et al. |
| 7,841,657 B2 | 11/2010 | Nishimoto et al. |
| 7,871,125 B2 | 1/2011 | Asbach et al. |

(56) References Cited

U.S. PATENT DOCUMENTS

| | | |
|---|---|---|
| 7,887,129 B2 | 2/2011 | Hei et al. |
| 7,891,732 B2 | 2/2011 | Hei et al. |
| 7,930,771 B2 | 4/2011 | Depreitere et al. |
| 7,938,731 B2 | 5/2011 | Papageorge et al. |
| 7,954,895 B2 | 6/2011 | Freeman et al. |
| 7,967,376 B2 | 6/2011 | Przybylo et al. |
| 7,987,525 B2 | 8/2011 | Summers et al. |
| 8,020,220 B2 | 9/2011 | McElroy et al. |
| 8,029,014 B2 | 10/2011 | Ahnert et al. |
| 8,047,608 B2 | 11/2011 | Damiani et al. |
| 8,056,975 B2 | 11/2011 | Longenecker et al. |
| 8,070,226 B2 | 12/2011 | Dingler et al. |
| 8,070,227 B2 | 12/2011 | Brunick et al. |
| 8,087,680 B2 | 1/2012 | Dotsey et al. |
| 8,147,345 B2 | 4/2012 | Furman |
| 8,166,573 B1 | 5/2012 | Chung et al. |
| 8,182,033 B2 | 5/2012 | Hei et al. |
| 8,197,005 B2 | 6/2012 | Hopke et al. |
| 8,205,940 B2 | 6/2012 | Mahal et al. |
| 8,209,784 B2 | 7/2012 | Nimmons et al. |
| 8,210,610 B2 | 7/2012 | Berkey et al. |
| 8,235,461 B2 | 8/2012 | Cohen |
| 8,235,465 B2 | 8/2012 | Hei et al. |
| 8,240,772 B2 | 8/2012 | Kawata et al. |
| 8,256,840 B2 | 9/2012 | Dasent et al. |
| 8,256,841 B2 | 9/2012 | Hei et al. |
| 8,286,990 B2 | 10/2012 | Tanizaki et al. |
| 8,297,694 B2 | 10/2012 | Arnold, IV et al. |
| 8,308,239 B2 | 11/2012 | Lundeen |
| 8,348,337 B2 | 1/2013 | Franck et al. |
| 8,388,058 B2 | 3/2013 | Krasley |
| 8,393,679 B2 | 3/2013 | Longenecker et al. |
| 8,408,656 B2 | 4/2013 | Carpenter |
| 8,419,129 B2 | 4/2013 | Inoue et al. |
| 8,424,964 B2 | 4/2013 | Campbell et al. |
| 8,430,452 B2 | 4/2013 | Brunick et al. |
| 8,434,827 B2 | 5/2013 | Young et al. |
| 8,449,030 B2 | 5/2013 | Powell et al. |
| 8,459,739 B2 | 6/2013 | Tamanouchi et al. |
| 8,474,907 B2 | 7/2013 | Weber et al. |
| 8,491,401 B2 | 7/2013 | Szymanski |
| 8,500,196 B2 | 8/2013 | Strong et al. |
| 8,511,749 B2 | 8/2013 | Hei et al. |
| 8,534,751 B2 | 9/2013 | Hei et al. |
| 8,540,312 B2 | 9/2013 | Asbach et al. |
| 8,550,556 B2 | 10/2013 | Asbach |
| 8,556,349 B2 | 10/2013 | Welch et al. |
| 8,622,478 B2 | 1/2014 | Spence |
| 8,632,127 B2 | 1/2014 | Brunick et al. |
| 8,640,267 B1 | 2/2014 | Cohen |
| 8,684,456 B2 | 4/2014 | Powell |
| 8,690,237 B2 | 4/2014 | Allen |
| 9,016,781 B2 * | 4/2015 | Cheng ................ B60N 2/2821 297/216.1 |
| 2001/0032351 A1 | 10/2001 | Nakayama et al. |
| 2004/0250339 A1 | 12/2004 | Musal |
| 2004/0255370 A1 | 12/2004 | Moeller |
| 2005/0278834 A1 | 12/2005 | Lee |
| 2006/0059605 A1 | 3/2006 | Ferrara |
| 2006/0059606 A1 | 3/2006 | Ferrara |
| 2006/0162053 A1 | 7/2006 | Lee |
| 2006/0242752 A1 | 11/2006 | Talluri |
| 2006/0277664 A1 | 12/2006 | Akhtar et al. |
| 2007/0040428 A1 | 2/2007 | Sakumoto |
| 2007/0046086 A1 | 3/2007 | Sakumoto |
| 2007/0068282 A1 | 3/2007 | Nakagawa et al. |
| 2007/0080568 A1 * | 4/2007 | Nakagawa ........... B60N 2/2809 297/253 |
| 2007/0107112 A1 | 5/2007 | Boyd |
| 2007/0119538 A1 | 5/2007 | Price |
| 2007/0130673 A1 | 6/2007 | Wasserkrug et al. |
| 2007/0157370 A1 | 7/2007 | Joubert Des Ouches |
| 2007/0226881 A1 | 10/2007 | Reinhard et al. |
| 2007/0284924 A1 * | 12/2007 | Gold .................... B60N 2/2821 297/253 |
| 2008/0222782 A1 | 9/2008 | Stokes |
| 2009/0026815 A1 | 1/2009 | Amesar et al. |
| 2009/0222964 A1 | 9/2009 | Wiles |
| 2009/0315299 A1 | 12/2009 | Barenbrug |
| 2011/0047678 A1 | 3/2011 | Barth et al. |
| 2011/0107503 A1 | 5/2011 | Morgan |
| 2011/0179557 A1 | 7/2011 | Rabie |
| 2011/0203024 A1 | 8/2011 | Morgan |
| 2011/0272925 A1 | 11/2011 | Dijkstra |
| 2012/0013157 A1 | 1/2012 | Keegan et al. |
| 2012/0060251 A1 | 3/2012 | Schimpf |
| 2012/0151663 A1 | 6/2012 | Rumbaugh |
| 2012/0186002 A1 | 7/2012 | Bhatnagar et al. |
| 2012/0216339 A1 | 8/2012 | Nimmons et al. |
| 2012/0233745 A1 | 9/2012 | Veazie |
| 2013/0015690 A1 * | 1/2013 | Mendis ................ B60N 2/2806 297/250.1 |
| 2013/0125294 A1 | 5/2013 | Ferrara |
| 2013/0340147 A1 | 12/2013 | Giles |

OTHER PUBLICATIONS

U.S. Appl. No. 62/043,947, filed Aug. 29, 2014, Cohen et al.
U.S. Appl. No. 62/043,955, filed Aug. 29, 2014, Cohen et al.
Children, NHTSA Traffic Safety Facts, 2003, National Center for Statistics and Analysis, DOT HS 809 762.
Children Injured in Motor Vehicle Traffic Crashes, NHTSA, May 2010, DOT HS 811 325.
U.S. Appl. No. 13/785,555, filed Mar. 5, 2013, Cohen.
Helmets Preventing Concussion Seen Quashed by NFL-Riddell, John Helyar, Mar. 18, 2013, Bloomberg.

* cited by examiner

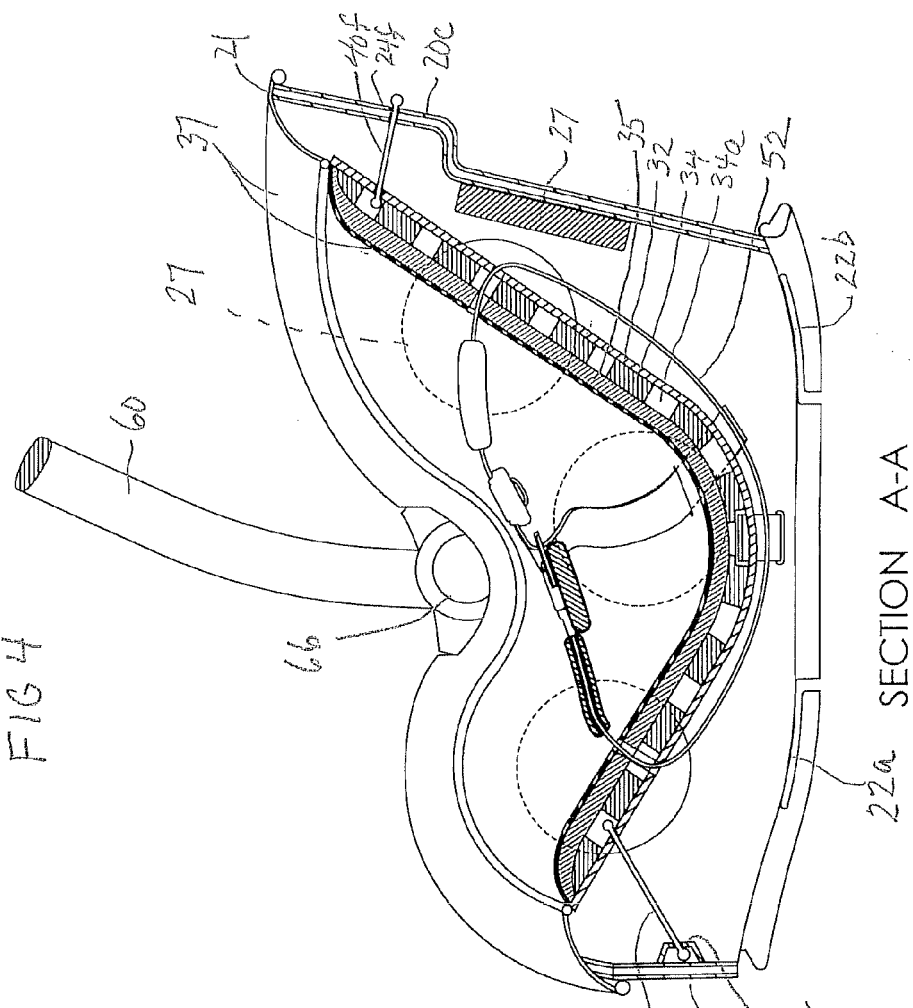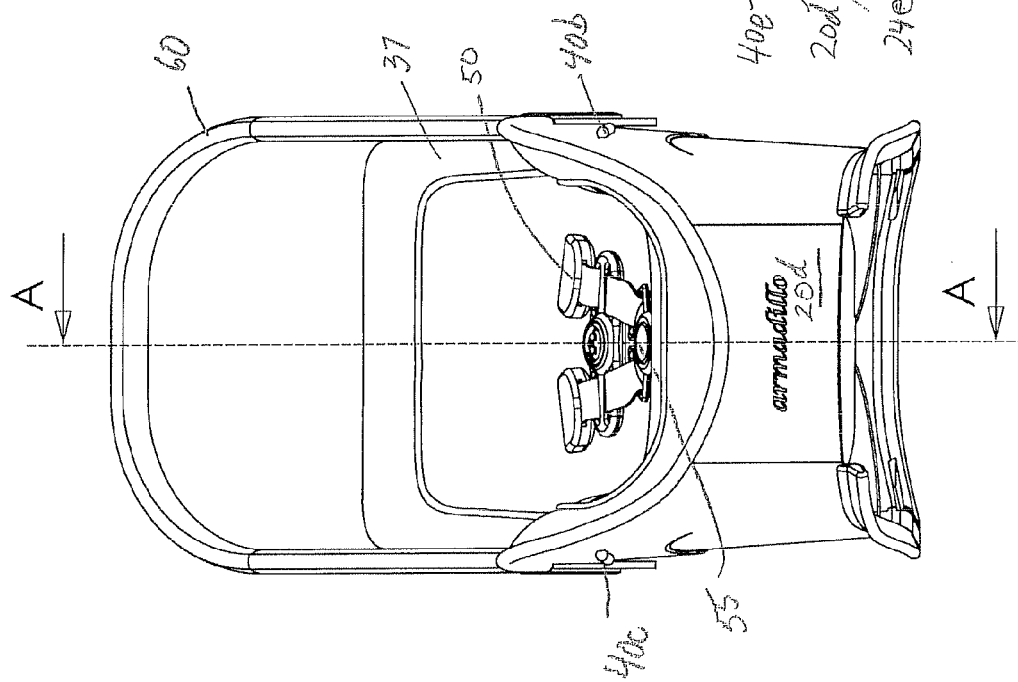

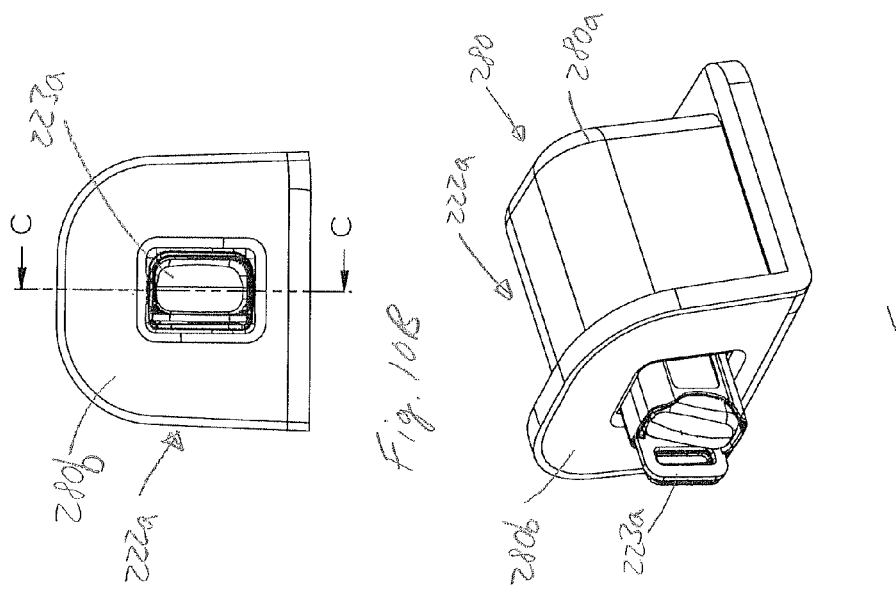
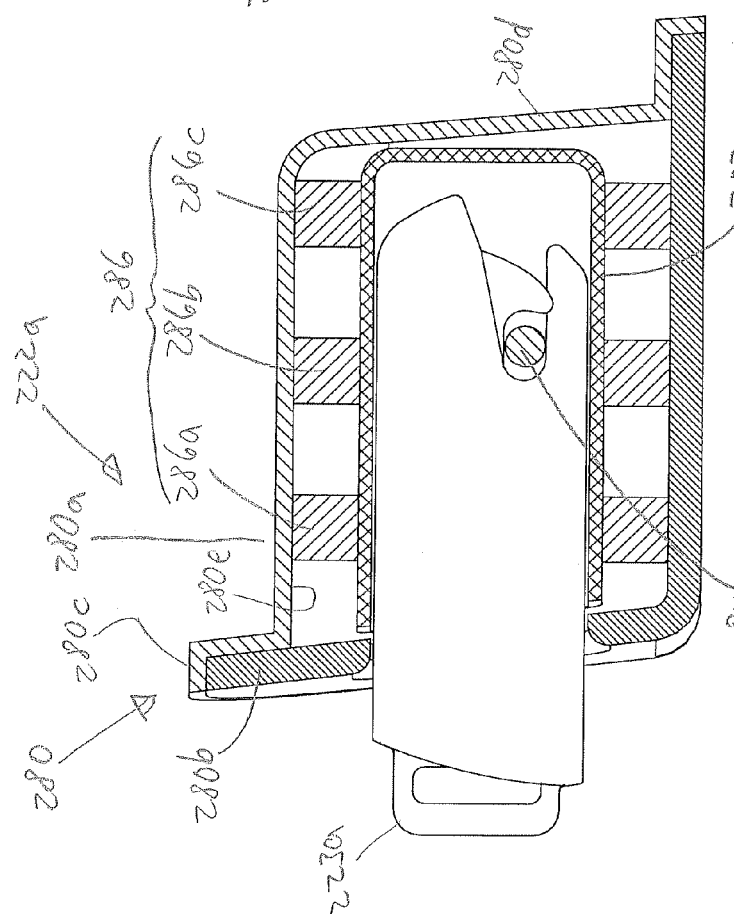

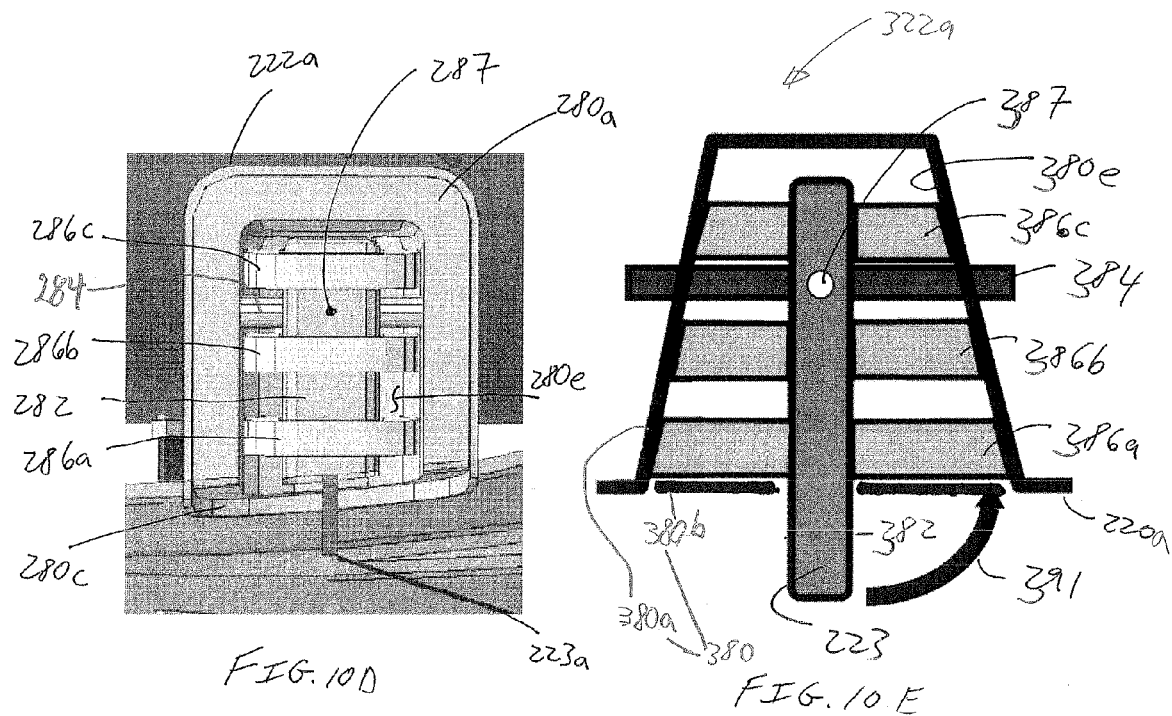

CAR SEAT

CROSS-REFERENCE TO RELATED APPLICATIONS

This application is related to co-owned U.S. patent application Ser. No. 13/785,555 (Cohen et al.) filed Mar. 5, 2013, the entire contents of which are hereby incorporated herein by reference.

BACKGROUND

1. Field

The present disclosure relates to car seats. More particularly, the present disclosure relates to safety car seats. The safety car seats may be for infants or children, although this application is not limited thereto.

2. State of the Art

The most common cause of death for children aged 1-5 in developed countries is by accident, and the leading cause of death by accident is due to car accidents. When properly installed in passenger cars, child safety seats have been reported to reduce fatal injury by about 71% for children under age one and by about 54% for toddlers aged 1-4. Nonetheless, in the U.S. alone, over 250 children aged 0-4 are fatally injured every year while properly restrained in their car seats.

In addition, to the fatalities, every year, thousands of children who are properly restrained in car seats still sustain incapacitating injuries resulting from car accidents. By far the most common severe injuries are head injuries, including cerebrum injuries (contusions or lacerations), concussions, skull vault and skull base fractures, subarachnoid hemorrhages, and subdural hematomas. Other common severe injuries are thoracic (lung and rib), abdominal (bowel, liver, spleen, kidney), spine, and upper extremity (clavicle, humerus, radius/ulna) and lower extremity (pelvis, femur, tibia/fibula) injuries. The injury outcome in children can be worse than similar injuries sustained by adults, and children who suffer traumatic brain injuries can experience lasting or late-appearing neuropsychological problems. For example, frontal lobe functions develop relatively late in a child's growth, so that injury to the frontal lobes may not become apparent until the child reaches adolescence.

According to the U.S. National Highway Traffic and Safety Administration (NHTSA), children under the age of one should always ride in a rear-facing car seat that has a harness. While it is recommended that rear-facing seats be used as long as possible, it is recognized that children aged 1 and over will wish to face forward. NHTSA recommends that children aged 1-3 (and older if they have not reached a certain height and weight) use a forward-facing car seat with a harness and tether that limits the child's forward movement during a crash.

There are many types of car seats available for purchase. Infant seats recommended for children under age 1 are typically rear-facing. Many include a base that is belted or tethered into the car and a seat that can latch into the base. The seat often includes a handle so that the seat may be carried when it is unlatched from the base (i.e., from the car). A popular car seat option for infants as well as children is a "convertible" car seat that may be oriented in a rear-facing position and the "converted" to a front-facing position. Some convertible car seats may even convert into a booster seat for children weighing up to 100 pounds. Typically the convertible car seats are strapped into the car using the car seat-belt, or are anchored to the car frame directly using a LATCH (Lower anchors and Tethers for children) system. All car seats offer a harness for strapping the child into the seat. The usual harness is a five-point safety harness. The car seats tend to be formed from injection molded plastic, typically at least 5 mm thick, and the seats (with base in the case of the infant seats) typically weigh 7 kgs or more.

ISOFIX (ISO standard 13216) is the international standard for attachment points for child safety seats in passenger cars. The system has various other regional names including LATCH ("Lower Anchors and Tethers for Children") in the United States and LUAS ("Lower Universal Anchorage System") or Canfix in Canada. It has also been called the "Universal Child Safety Seat System" or UCSSS.

ISOFIX relates to the anchoring system for Group 1 child safety seats. It defines standard attachment points to be manufactured into cars, enabling compliant child safety seats to be quickly and safely secured. ISOFIX is an alternative to securing the seat with seat belts. Seats are secured with a single attachment at the top (top tether) and two attachments at the base of each side of the seat. The full set of anchor points for this system were required in new cars in the United States starting in September 2002.

In the EU the system is known as ISOFIX and covers both Group 0/0+ and Group 1 child safety seats. The mechanism for attaching the seat to the Lower Anchors is quite different from that in the United States. In the EU two "alligator-like" clips connect the seat to the Lower Anchors rather than the open clip style connectors commonly used in the United States. However, some car seat manufactures are beginning to offer true ISOFIX type attachments in the U.S. In the European standard, there are also various installation categories: "universal", "vehicle-specific" and "semi-universal". The main difference is that "Universal" represents use of a top tether strap with the ISOFIX anchorage, "vehicle-specific" represents the usage of the ISOFIX anchorage without the Top Tether in specified vehicles only, while "Semi-Universal" represents usage of the ISOFIX anchorage together with a "foot-prop".

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A car seat includes an outer protective shell or frame, an inner seat, a harness, and a suspension system. The protective shell or frame is adapted to be strapped or anchored to the car frame. The inner seat is connected to the protective shell or frame by the suspension system for shock isolation such that the inner seat can move (float) a small amount relative to the protective shell. The harness is not attached to the outer protective shell or frame, but extends through slots in the inner seat and keeps the passenger in the inner seat.

In one embodiment, the suspension system is a seven-point suspension system. The seven-point suspension system may include seven webs or belts, most or all of which are between 0.75 and 3 inches long that are used to suspend the inner seat relative to the outer frame. The webs or belts can be made from various materials including, but not limited to, ABS, plastic, fabric webbing such as car seatbelt webbing, and ULTEM® 292a, 292b, or similar material. In one embodiment, respective slots are provided in the outer frame and the shell of the inner seat through which the webs extend, and the respective ends of each web are either sewn on themselves or sewn around a stick or other object so that the end is too thick to pull through the slots.

In one embodiment, the outer protective shell or frame is a multi-layered construction of strong, light material.

In one embodiment, the inner seat is a protective seat made from a multi-layered construction. In one embodiment the multi-layered construction of the inner seat includes (from outside to inside) a flexible hard outer shell, a cushioning spacer layer, a uniform foam layer, and an optional fabric or leather layer. The cushioning spacer layer does not cover the entire inside of the hard outer shell nor the entire outside of the uniform foam layer. The inner seat construction is arranged to redirect energy transmitted from the outer shell along a circuitous path.

In one embodiment, the multiple layers of the inner seat have slots through which harness belts extend. In one embodiment a five-point harness has several belts that are attached to each other and wrap around the inner seat.

In one embodiment, a removable fabric cover may be used to cover the inside of the inner seat and the space between the inner seat and the outer frame.

In one embodiment, the car seat extends in a major direction along a longitudinal axis and the outer protective shell includes a plurality of anchor boxes that extend at an angle with respect to the longitudinal axis. The angle can be a ninety-degree angle.

BRIEF DESCRIPTION OF THE DRAWINGS

FIG. 3 is a front view of the car seat of FIG. 1.

FIG. 4 is a cross-sectional view of the car seat of FIG. 1 taken at A-A of FIG. 3.

FIG. 10A is a perspective view of an anchor box and tether connector shown in FIG. 7.

FIG. 10B is a side elevation view of the anchor box and tether connector shown in FIG. 10A.

FIG. 10C is a cross-sectional view of the anchor box and tether connector of FIG. 10A taken at C-C of FIG. 10B.

FIG. 10D is an elevation view of the anchor box and tether connector shown in FIG. 10A with a cover of the anchor box removed.

FIG. 10E is schematic representation of an alternate anchor box construction from that shown in FIG. 10D.

DETAILED DESCRIPTION

Figure 1:
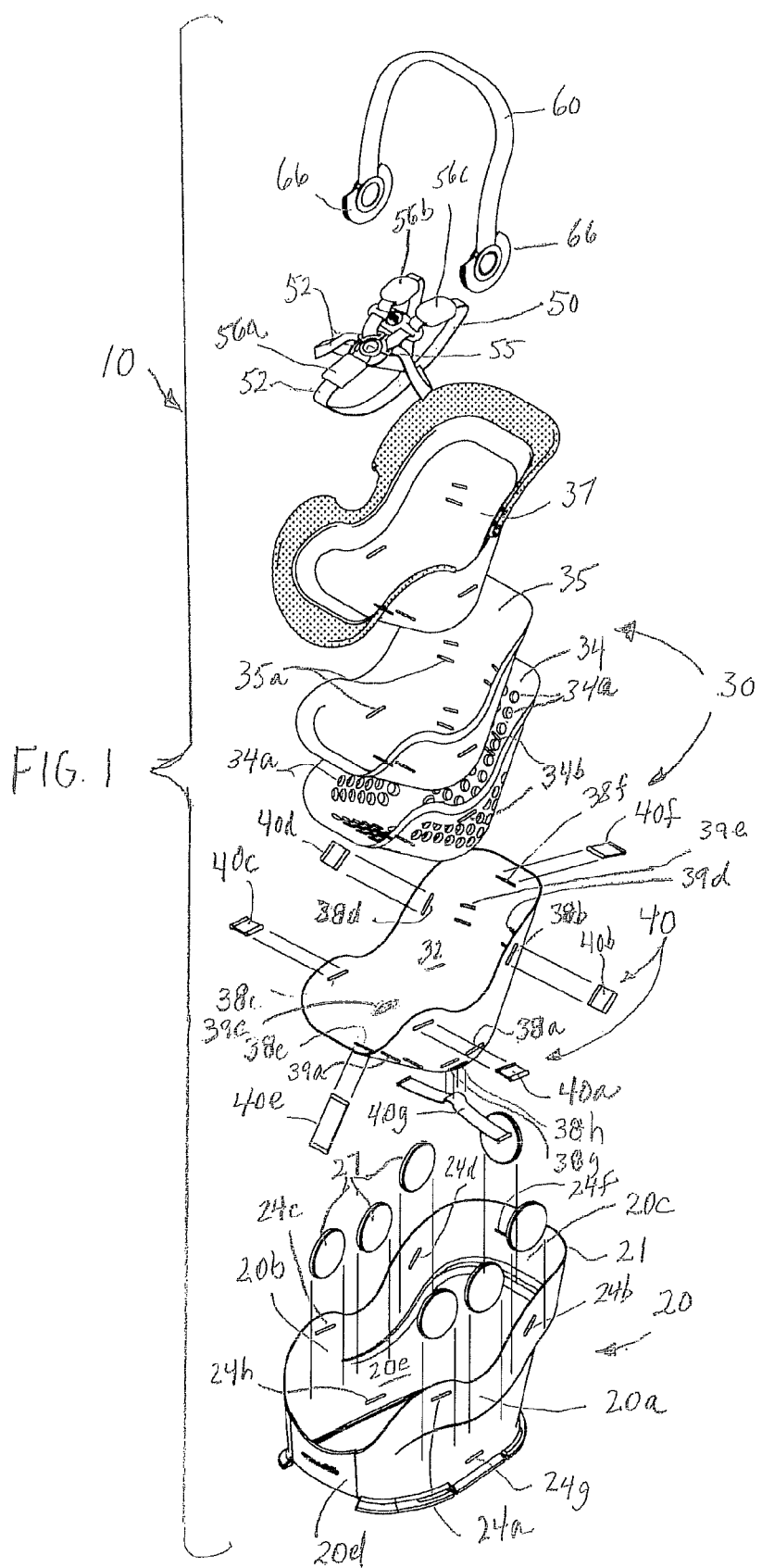
FIG. 1 is an exploded view of a car seat.
Figure 2:
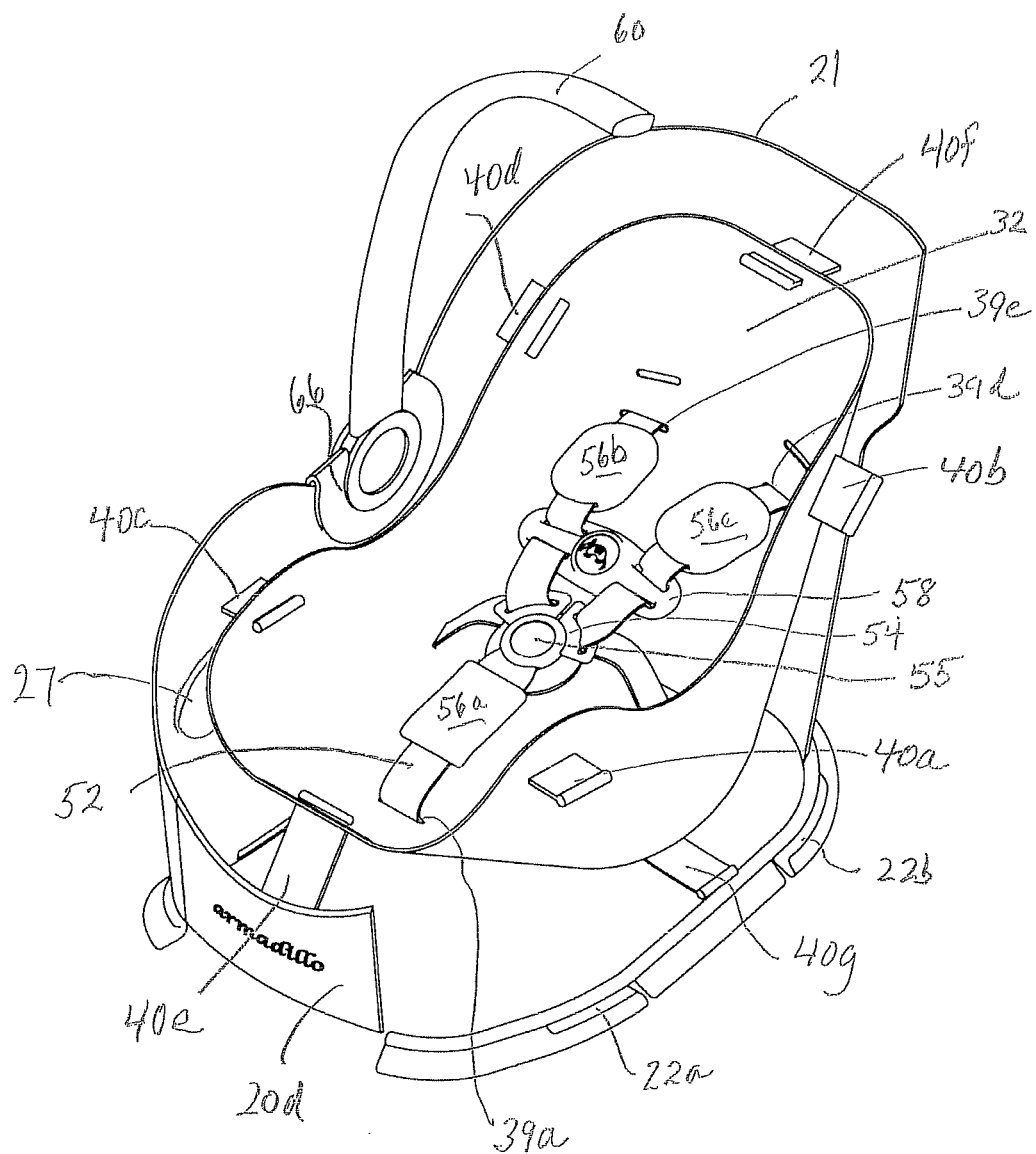
FIG. 2 is a perspective, partially broken view of the car seat of FIG. 1 without the removable fabric cover and inner seat layers.
Figure 5:
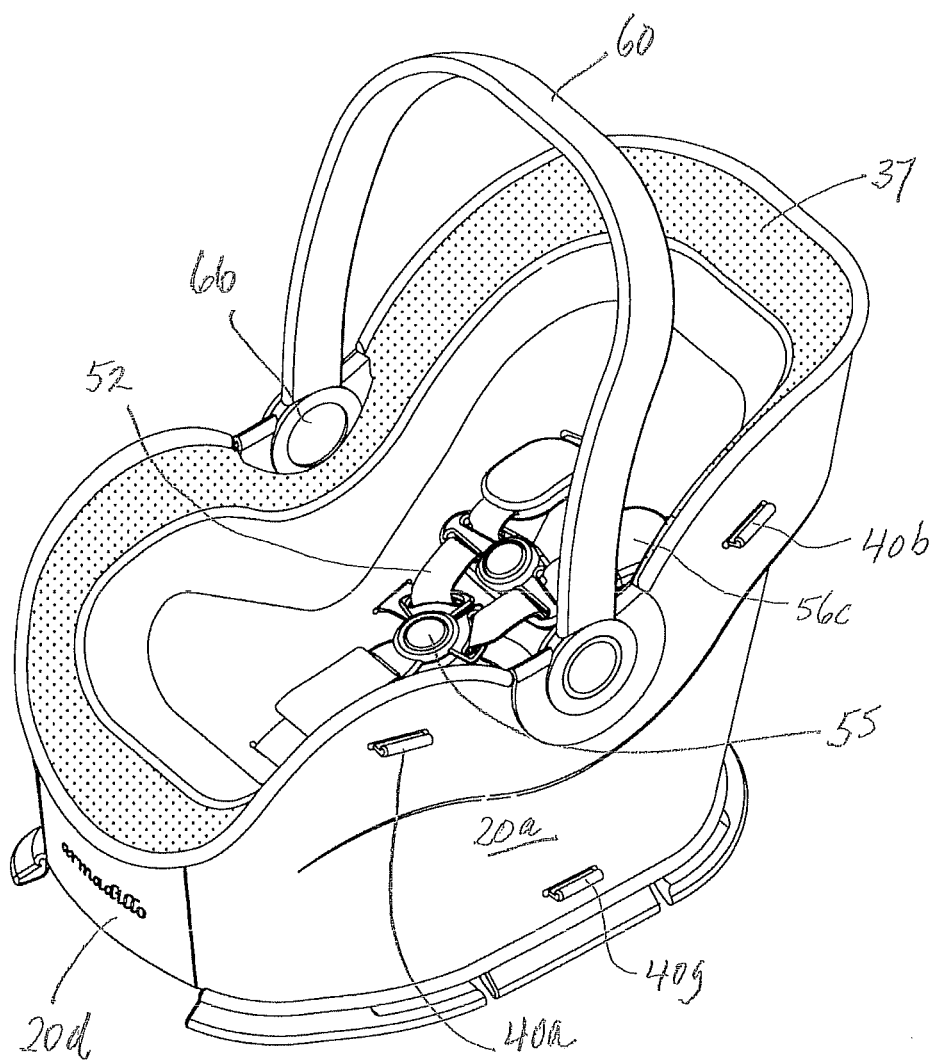
FIG. 5 is a perspective view of the car seat of FIG. 1.

One embodiment of a car seat 10 is seen in FIGS. 1-5. Car seat 10 includes an outer protective shell 20, an inner seat 30, a suspension system 40 and a harness 50. The protective shell 20 is adapted as described below to be strapped or anchored to a car frame (not shown). The inner seat 30 is connected to the protective shell 20 by the suspension system 40 such that the inner seat can move (float) a small amount relative to the protective shell 20 as described below. Thus, the outer shell 20 provides support for the seat 30 (via the suspension system 40) but is not rigidly attached thereto. The harness 50 extends through and around the inner seat 30 and is not attached to the outer protective shell 20. A handle 60 connected to the shell 20 is optionally provided.

In one embodiment, the outer protective shell or frame 20 is made from a strong, light material such as carbon fiber or an aramid fiber such as KEVLAR (a trademark of DuPont, Wilmington, Del.), or any other strong, light material. In one embodiment, the shell 20 is constructed of multiple layers of carbon fiber, aramid fiber or a composite material. In another embodiment, the outer protective shell is formed from two separated layers of carbon fiber, aramid fiber or composite material (as seen, e.g., in FIG. 4) sandwiching a honeycomb, foam, or corrugated material (not shown). In other embodiments, the shell 20 is constructed of one or more of polycarbonate, polypropylene, ABS resin, and fiberglass. One function of the shell 20 is to provide support for the seat 30 via the suspension system 40. Another function of the shell 20 is to provide protection from intrusion by exterior objects.

In one embodiment the shell 20 provides side and back walls 20a-20c and a front wall 20d that connects the side walls 20a, 20b at the front of the car seat. The back wall 20c provides a high back compared to the front wall 20d, which is low. The side walls are contoured to extend from the back to the front. The front, back and side walls provide an upper edge 21 to which or over which a seat cover may be attached as described hereinafter. All walls may be rounded to eliminate edges so there may be no exact delineation of the front, side, and back walls.

As seen in FIGS. 1-5, the side walls 20a, 20b define fore and aft slots 22a, 22b (two more slots not shown) for receiving a seat belt therethrough, thereby permitting the car seat 10 to be strapped in facing forwards or backwards. If desired a belt (not shown) may be provided having one end attached to the shell 20 and a hook (not shown) located at the other end. The hook may be used to connect to the frame of the car (not shown) located under the car's seat cushion (not shown). In another embodiment, the shell 20 may be adapted to rigidly connect to a separate base that can be strapped or anchored in place in the car. In another embodiment, the shell 20 may be adapted so that hooks from the car (not shown) can attach to the shell 20.

Shell 20 also defines a series of slots 24 for receiving the belts 40a-40g of the suspension system 40. In the embodiment shown, eight slots 24a-24h are provided, including two slots each (24a-24d) towards the top of side walls 20a, 20b, a single slot 24e in the bottom of the front wall 20d of the car seat (see FIG. 4), a single slot 24f in the top of the back wall 20c, and a single slot each 24g, 24h toward the bottom of the side walls 20a, 20b. Belts 40a-40g, as described in more detail below, couple the shell 20 to the inner seat 30. It will be appreciated that if it is desired that the belts not be seen from the outside, the slots are built into the inner side of the wall as shown for slot 24e of FIG. 4. Otherwise, the slots may extend through the walls of the shell 20 as seen with respect to slots 24a-24d, 24f-24h. For purposes herein, a "slot" in a wall may be considered a through-slot, or a hook or catch that allows attachment for the belt or attachment device to the shell 20.

In one embodiment, shell 20 also defines holes or slots (not shown) for receiving a connection mechanism or support 66 for a handle 60.

In one embodiment, a plurality of optional padding elements 27 are spaced around the inside surface 20e of the shell 20. The padding elements 27 are located such that should the shell 20 be subjected to significant forces and movement relative to the seat 30, the padding elements 27 will contact the seat 30 and largely prevent the inside surface 20e of the shell 20 from contacting the seat 30. In one embodiment, the padding elements 27 are thick enough so that they extend from the inside surface 20e and contact the seat 30 so that should the shell 20 be subjected to significant forces and movement relative to the seat 30, the padding elements 27 will already be in contact with the seat 30 to absorb energy from the moving seat 30. The padding elements 27 may be formed from an elastomeric, cellular foam or any other desirable foam. In another embodiment, the padding elements are comprised of thermoplastic polyurethane (TPU). In another embodiment, the pads 27 are comprised of open-cell polyurethane. In another embodiment, the pads are comprised of closed cell polyolefin foam. In another embodiment, the pads are comprised of polyethylene foam which may be a high density polyethylene foam. In one embodiment the padding elements 27 are formed as a single pad defining multiple cut-outs (i.e., the equivalent of multiple connected pads). Regardless, the single pad with the cut-outs or the multiple pads 27 are arranged in a desired configuration and are affixed to the inner surface 20e of the shell and the outer surface of inner seat 30. Affixation can be done with glue, Velcro or any other affixation means. By way of example, and not by way of limitation, the innermost cushioning pads may have a density of between 3.4 lbs/ft$^3$ (approximately 0.016 g/cm$^3$) and 25 lbs/ft$^3$ (approximately 0.4 g/cm$^3$), although they may be more dense or less dense.

The outer dimensions of the shell 20 may vary widely. The shell 20 may be between 40 and 70 cm wide, or even narrower or wider, and between 20 and 60 cm deep, or even shallower or deeper, and between 50 and 80 cm high, or even shorter or taller. In one exemplary embodiment the outer dimensions of the shell is 50 cm wide (plus or minus 5 cm), 28 cm deep (plus or minus 3 cm), and 68 cm high (plus or minus 7 cm).

The inner seat 30 is scooped in shape with a relatively high back, a deep seat area (for the buttocks), and a slightly rising surface for the thighs and legs. In one embodiment, the inner seat 30 is a protective seat made from a multi-layered construction. In one embodiment the inner seat includes a flexible hard outer shell layer 32, a cushioning spacer layer 34, and uniform foam layer 35, and an attached fabric or leather layer 37. The cushioning spacer layer 34 does not cover the entire inside of the hard outer shell layer 32 nor the entire outside of the uniform foam layer 35. The fabric or leather layer 37 can extend beyond the inner seat 30 and attaches to the edge 21 of the shell 20 but does not inhibit seat 30 from moving relative to the shell 20. In another embodiment the multi-layered construction of the inner seat includes (from outside to inside) a hard outer shell layer 32, a cushioning spacer layer 34, and a uniform foam layer 35. An optional plastic, leather, or fabric layer (not shown) may be provided over the foam layer 35. A separate removable seat cover can be provided that extends over the seat 30 and attaches to the edge 21 of the shell 20. Again, the separate removable seat cover would not inhibit seat 30 from moving relative to the shell 20. The inner seat construction is arranged to redirect energy transmitted from the outer shell along a circuitous path so as to absorb the energy. The inner seat 30 also defines a plurality of (e.g., eight) slots 38a-38h for receiving belts 40a-40g of the suspension system 40, and a series of slots 39a-39e for receiving belts 52 of harness 50.

In one embodiment, the hard outer shell layer 32 of inner seat 30 is comprised of a polycarbonate shell. In another embodiment, the hard outer shell 32 is comprised of a different hard plastic such a polypropylene. In another embodiment, the hard outer shell 32 is comprised of ABS resin. In another embodiment, the hard outer shell layer 32 is made of carbon fiber or fiberglass.

In one embodiment, the cushioning spacer layer 34 of inner seat 30 includes multiple spaced pads. In another embodiment, the cushioning spacer layer 34 comprises a single pad defining multiple cut-outs 34a (i.e., the equivalent of multiple connected pads). In one embodiment the cushioning spacer layer 34 is comprised of foam. The foam may be an elastomeric cellular foam or any other desirable foam. In another embodiment, the cushioning spacer layer is comprised of thermoplastic polyurethane (TPU). In another embodiment, the cushioning spacer layer is comprised of open-cell polyurethane. In another embodiment, the cushioning spacer layer is comprised of closed cell polyolefin foam. In another embodiment, the cushioning spacer layer is comprised of polyethylene foam which may be a high density polyethylene foam. In another embodiment, the cushioning spacer layer 34 has multiple layers formed from different materials. By way of example and not by way of limitation, the cushioning spacer layer may be between 3 mm and 26 mm thick, although it may be thinner or thicker. As another example, the cushioning spacer layer may be between 6 and 13 mm thick. By way of example, and not by way of limitation, the cushioning spacer layer may have a density of between 3.4 lbs/ft$^3$ (approximately 0.016 g/cm$^3$) and 25 lbs/ft$^3$ (approximately 0.4 g/cm$^3$), although it may be more dense or less dense.

According to one embodiment, the cushioning spacer layer 34 covers approximately fifty percent of the inner surface area of the hard outer shell 32. In another embodiment, the spacer layer 34 covers between twenty percent and eighty percent of the inner surface area of the hard shell 32. In these embodiments, the spacer layer defines air gaps located between said hard outer shell 32 and said foam layer 35. The spacer layer 34 should cover sufficient area between the hard shell 32 and the foam layer 35 so that upon external impact to the inner seat 30, the shell 32 does not directly come into contact with the foam layer 35. Regardless of the material and arrangement of the cushioning spacer layer 34, in one embodiment the cushioning material is affixed to the hard shell layer 32 and to the foam layer 35. Affixation can be done with glue, Velcro or any other affixation means.

Cushioning spacer layer 34 is also provided with a series of slots 34b corresponding to slots 39a-39e of the flexible hard outer shell layer 32 for receiving the harness straps.

In one embodiment the foam layer 35 is a substantially continuous uniform layer interrupted only by slots 35a for the belts of the harness 50. The foam may be an elastomeric, cellular foam or any other desirable foam. In one embodiment, the foam layer 35 is comprised of closed cell polyolefin foam. In another embodiment, the foam layer is comprised of polyethylene foam which may be a high density polyethylene foam. By way of example and not by way of limitation, the foam layer may be between 3 mm and 13 mm thick, although it may be thinner or thicker. By way of example, and not by way of limitation, the foam layer may have a density of between 3.4 lbs/ft$^3$ (approximately 0.016 g/cm$^3$) and 25 lbs/ft$^3$ (approximately 0.4 g/cm$^3$), although it may be more dense or less dense.

All dimensions of the inner seat 30 are generally chosen to be smaller than the dimensions of the shell 20. Thus, inner seat 30 is suspended substantially within the shell 20 and generally protected by the shell 20.

The suspension system 40 functions to suspend the inner seat 30 relative to the outer shell 20 and to thereby act as a shock absorber/isolater between the shell 20 and the seat 30. In one embodiment, the suspension system 40 is a seven point suspension system with seven webs or belts 40a-40g. Some or all of the webs or belts 40a-40g may be the same length. Thus, by way of example only, belts 40a-40f may each be between approximately 2 cm and 5 cm in length, while belt 40g may be between 30 cm and 50 cm in length. Belt 40g is shown as extending through slots 38g and 38h in the buttocks area of the outer seat layer 32 and attaching to sides 20a and 20b of the shell 20 at slots 24g, 24h. Of course, other lengths may be used. If desired, belt 40g may be attached to the back wall 20c of the shell 20. In one embodiment, the belts extend through the slots 24a-24h in the shell 20 and the slots 38a-38h in the inner seat 30 and are doubled over at each end and sewn at each end to prevent removal. In another embodiment, the ends of each belt extend around a stick or other object and are sewn so that the ends are too thick to remove through the slots. The webs or belts may be formed from a thick web of strong material such as polyester or nylon.

In one embodiment the harness 50 is a five-point harness as is known in the art. The harness 50 includes belt(s) 52 such that a central (crotch) belt or strap extends through slot 39a of seat 30, a lap belt extends through slots 39b, 39c of the seat 30, and shoulder belts extend through slots 39d and 39e of seat. Buckles and latches 54 may be provided with a push button 55 that permits release of the buckles. Guard pads 56a, 56b, 56c may be provided on the crotch and shoulder belts, and a clip 58 coupling the shoulder belts may be provided. The entire harness system 50 may be formed from standard materials and may constitute a standard five-point harness system that acts to keep the passenger in the seat 30. As will be appreciated, the belt(s) of the harness extend through slots in the layers of seat 30 and extend around the front and backside of the seat 30, but are not attached directly to the seat 30. The belt(s) 52 are optionally adjustable in length.

Optional handle 60 is attached by support mechanisms 66 to respective sides 20a, 20b of the shell 20. Handle 60 may swivel relative to support mechanisms 66 as is known in the art.

The embodiments of the car seat described with reference FIGS. 1-5 provide a highly protective, safe, and strong car seat system. In particular, because of the suspension system, in case the car in which the car seat is anchored is in an accident that causes sudden acceleration and/or deceleration of the car, force that is applied to the shell which is anchored to the car is not transferred to the inner seat and is therefore not applied to the occupant of the seat. More particularly, in the case of an accident, regardless of the direction in which the seat is facing and regardless of whether the result is a sudden acceleration and/or deceleration, the inner seat will move inside the shell, and the suspension system will absorb some, much, or all of the energy. The inner seat will swing inside the shell to the extent allowed by the belts of the suspension system (it being appreciated that the fabric or leather covering will easily comply). In addition, should the force be significant enough to cause the inner seat and shell to contact each other (at the optional foam pads on the inside of the shell), the construction of the inner seat with its foam spacer layer located between a hard outer layer and an inside foam layer is energy absorbing. Thus, some, most, or all of the energy that is transferred from the shell to the inner seat will be absorbed by the seat itself rather than transferred to the occupant of the seat. Furthermore, should the accident cause dislocation of the interior of the car or should an object hit the shell of the car seat, the shell is of extremely high strength and will remain structurally intact in almost all circumstances. Thus, the occupant of the car seat will not be crushed and will be protected by the foam padding of the seat. Further yet, it should be appreciated that the described car seat system will be light in weight (e.g., under 4 kg; and possibly around 3 kg).

Figure 6:
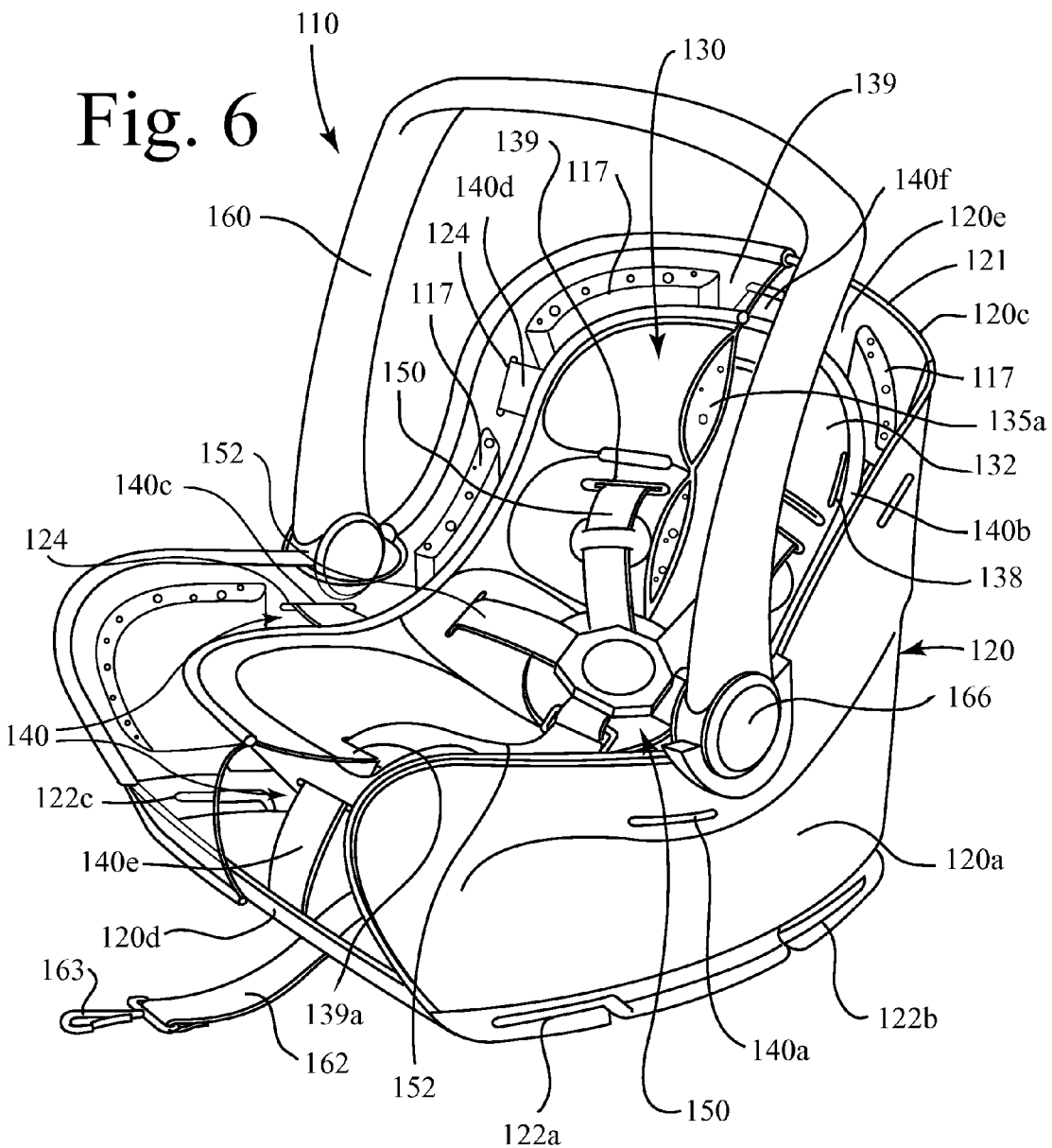
FIG. 6 is a perspective, partially cut-away, partially transparent view of another embodiment of a car seat.

FIG. 6 provides an alternate embodiment of a car seat 110 that is similar to car seat 10 of FIGS. 1-5, with similar elements numbered similarly but increased by "100". Car seat 110 includes an outer protective shell 120, an inner seat 130, a suspension system 140 and a harness 150. The protective shell 120 is adapted as described below to be strapped or anchored to a car frame (not shown). The inner seat 130 is connected to the protective shell 120 by the suspension system 140 such that the inner seat can move (float) a small amount relative to the protective shell 120 as described below. Thus, the shell 120 provides support for the seat 130 (via the suspension system 140) but is not rigidly attached thereto. The harness 150 is attached to the inner seat 30 and not to the outer protective shell 120. A handle 160 connected to the shell 120 is optionally provided.

The outer protective shell 120 can be made from the same material as shell 20 of FIGS. 1-5. Shell 120 provides side and back walls 120a-120c and a front wall or slat 120d that connects the side walls 120a, 120b at the front of the car seat. The back wall 120c provides a high back compared to the front wall 120d which is low and short. The side walls are contoured to extend from the back to the front. The front, back and side walls provide an upper edge 121 to which or over which a seat cover may be attached as described hereinafter.

As seen in FIGS. 1-5, the side walls 120a, 120b define fore and aft slots 122a, 122b, 122c (one more slot not shown) for receiving a seat belt therethrough, thereby permitting the car seat 110 to be strapped in facing forwards or backwards. In addition, or alternatively, a belt 162 is provided having one end attached to the shell 120 and a hook 163 located at the other end. The hook 163 may be used to connect to the frame of the car (not shown) located under the car's seat cushion (not shown). In another embodiment, the shell 120 may be adapted to rigidly connect to a separate base that can be strapped or anchored in place in the car.

Shell 120 also defines a series of slots 124 for receiving the belts 140 (belts 140a-140f shown; one belt not shown) of the suspension system 140. Seven slots are provided, including two slots each in side walls 120a, 120b, a single slot in the front wall 120d of the car seat, a single slot in the top of the back wall 120c, and a single slot in the bottom of the back wall 120c. Belts 140 couple the shell 120 to the inner seat 130.

Shell 120 also defines holes, slots, or surfaces for receiving a connection mechanism or support 166 for a handle 160. Also, a plurality of padding elements 127 are spaced around the inside surface 120e of the shell 120. The padding elements 127 are located such that should the shell 120 be subjected to significant forces and movement relative to the seat 130, the padding elements 127 will contact the seat 130 and largely prevent the inside surface 120e of the shell 120 from contacting the seat 130. The padding elements 127 may be formed from the same materials discussed above with reference to padding elements 27 of FIGS. 1-5.

The inner seat 130 is scooped in shape with a relatively high back, a deep seat area (for the buttocks), and a slightly rising surface for the thighs and legs. The inner seat 30 is a protective seat made from a multi-layered construction. The inner seat includes a hard outer shell 132, and an attached fabric or leather layer 139 that incorporates foam pillows 135a therein. The fabric or leather layer 139 extends beyond the inner seat 130 and attaches to the edge 121 of the shell 120 but does not inhibit seat 130 from moving relative to the shell 120. The inner seat 130 also defines a plurality of (e.g., seven) slots 138 for receiving belts of the suspension system 140, and a series of slots 139 for receiving belt(s) 152 of the harness system 150. The hard outer shell 132 of inner seat 130 may be formed from the same materials discussed above with reference to shell 32 of FIGS. 1-5.

The suspension system 140 functions to suspend the inner seat 130 relative to the outer shell 120 and to thereby act as a shock absorber/isolater between the shell 120 and the seat 130. The suspension system 140 is a seven-point suspension system with seven webs or belts (six shown 140a-140f). The belts may be configured and formed in a manner such as belts 40a-40g of FIGS. 1-5.

The harness 150 is a five-point harness system with belt(s) 152 that include a central (crotch) belt attached through slot 139a of seat 130 and shoulder belts and lap belts attached through similar slots of the seat. The entire harness system 150 may be formed from standard materials. As will be appreciated, the belt(s) of the harness extend through slots in the layers of seat 130 and extend around the front and backside of the seat 130, but are not attached directly to the seat 130. The belt(s) 152 are optionally adjustable in length.

Optional handle 160 is attached by support mechanisms 166 to respective sides 120a, 120b of the shell 120. Handle 160 may swivel relative to support mechanisms 166 as is known in the art.

The embodiments described with reference to FIG. 6 provides a highly protective, safe, and strong car seat system similar to that of the embodiments described with reference to FIGS. 1-5, although it is noted that the inner seat of FIG. 6 itself is not as energy absorbent as the inner seats described with reference to FIGS. 1-5.

Figure 7:
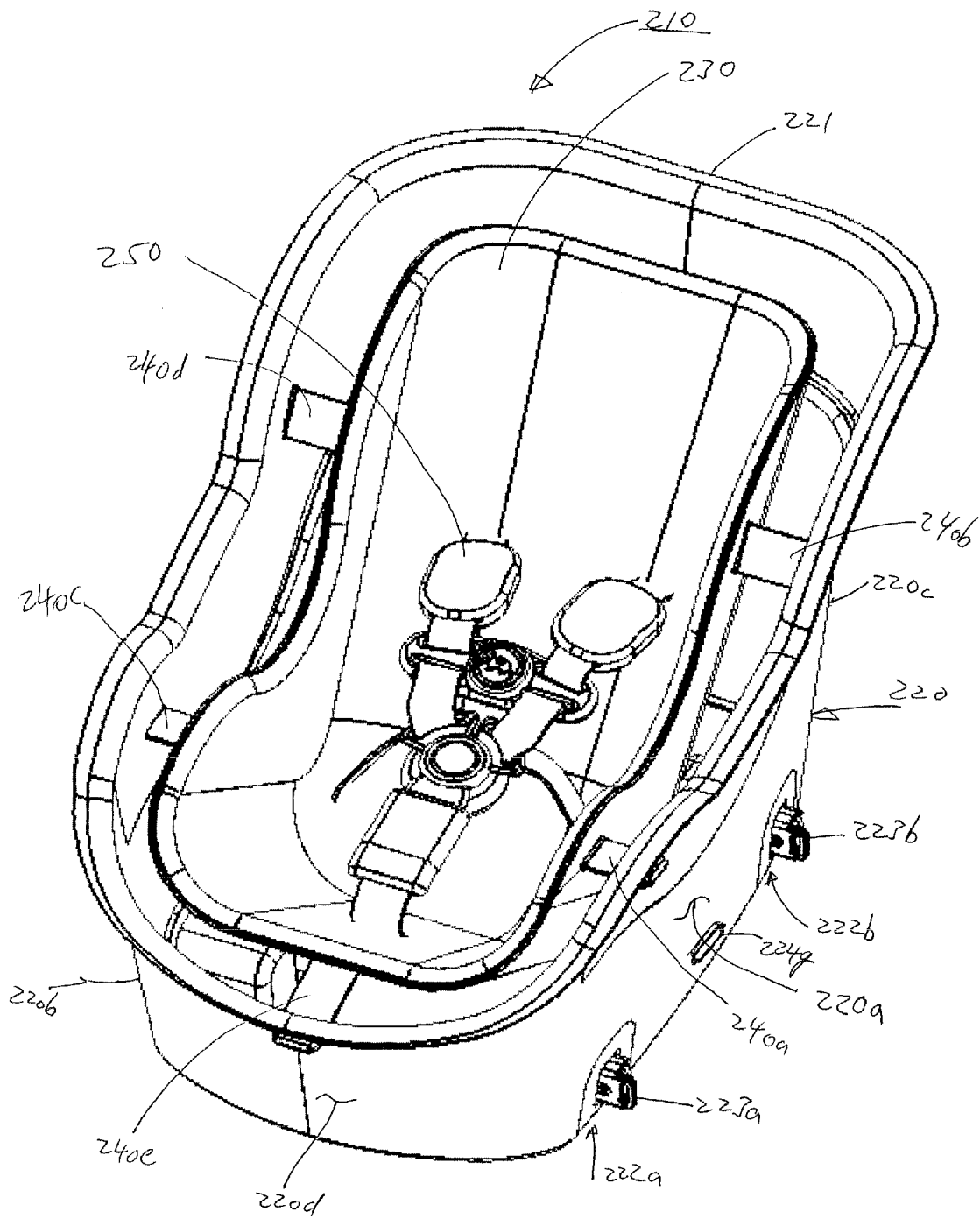
FIG. 7 is a perspective view of another embodiment of a car seat.
Figure 15:
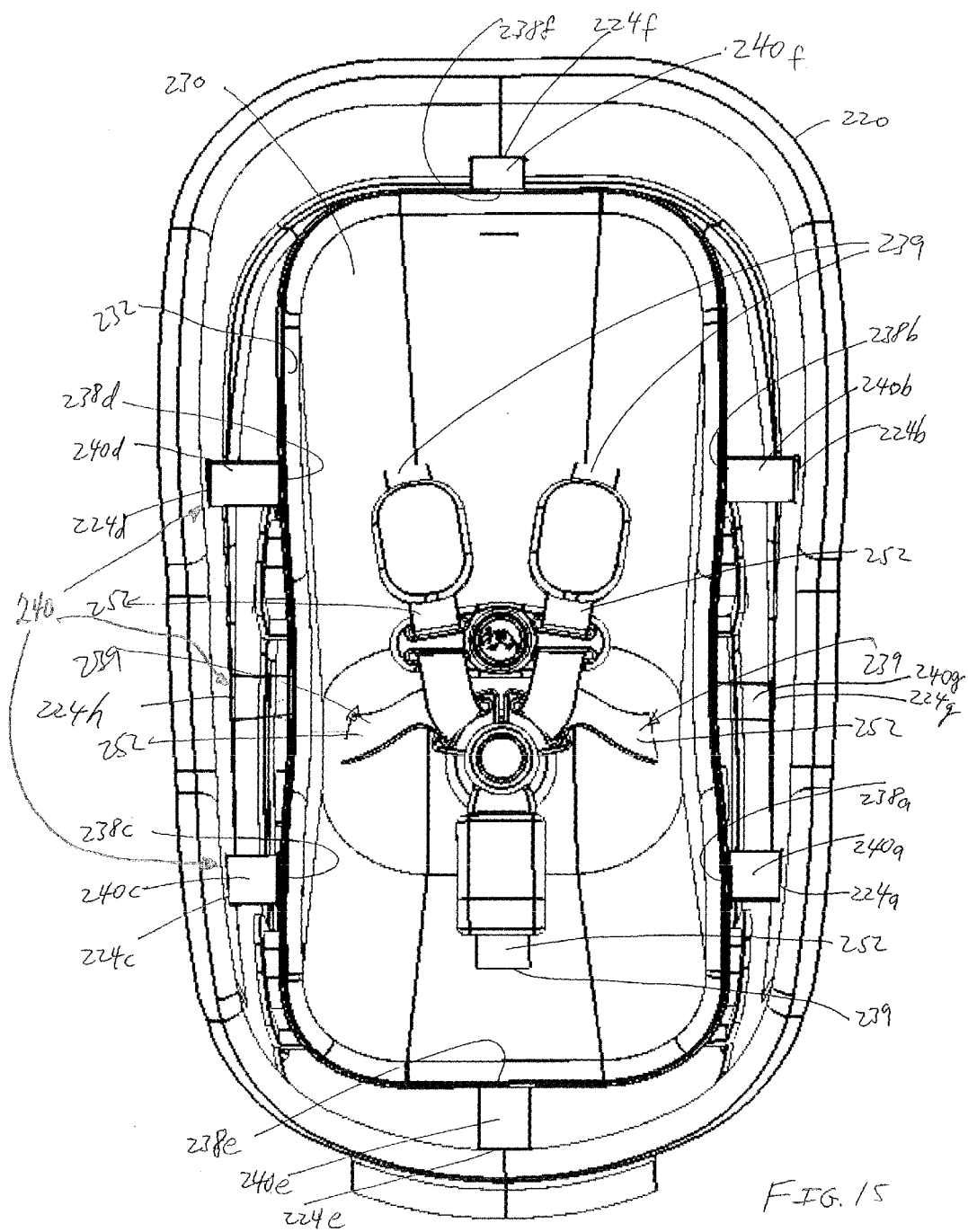
FIG. 15 is a top plan view of the car seat shown in FIG. 7.

FIG. 7 shows an alternate embodiment of a car seat 210 that is similar to car seat 10 of FIGS. 1-5, with similar elements numbered similarly but increased by "200". Car seat 210 includes an outer protective shell 220, an inner seat 230, a suspension system 240 (FIG. 15). The protective shell 220 is adapted as described below to be strapped or anchored to a car frame (not shown). The inner seat 230 is connected to the protective shell 220 by the suspension system 240 such that the inner seat can move (float) a small amount relative to the protective shell 220 as described below. Thus, the shell 220 provides support for the seat 230 (via the suspension system 240) but is not rigidly attached thereto. The harness 250 is attached to the inner seat 230 and not to the outer protective shell 220. A handle (not shown), like handle 60 shown in FIG. 1, connected to the shell 220, is optionally provided.

The outer protective shell 220 can be made from the same material as shell 20 of FIGS. 1-5. Shell 220 provides side and back walls 220a-220c and a front wall or slat 220d that connects the side walls 220a, 220b at the front of the car seat. The back wall 220c provides a high back compared to the front wall 220d, which is low and short. The side walls are contoured to extend from the back to the front. The front, back and side walls provide an upper edge 221 to which or over which a seat cover may be attached as described hereinafter.

Figure 8:
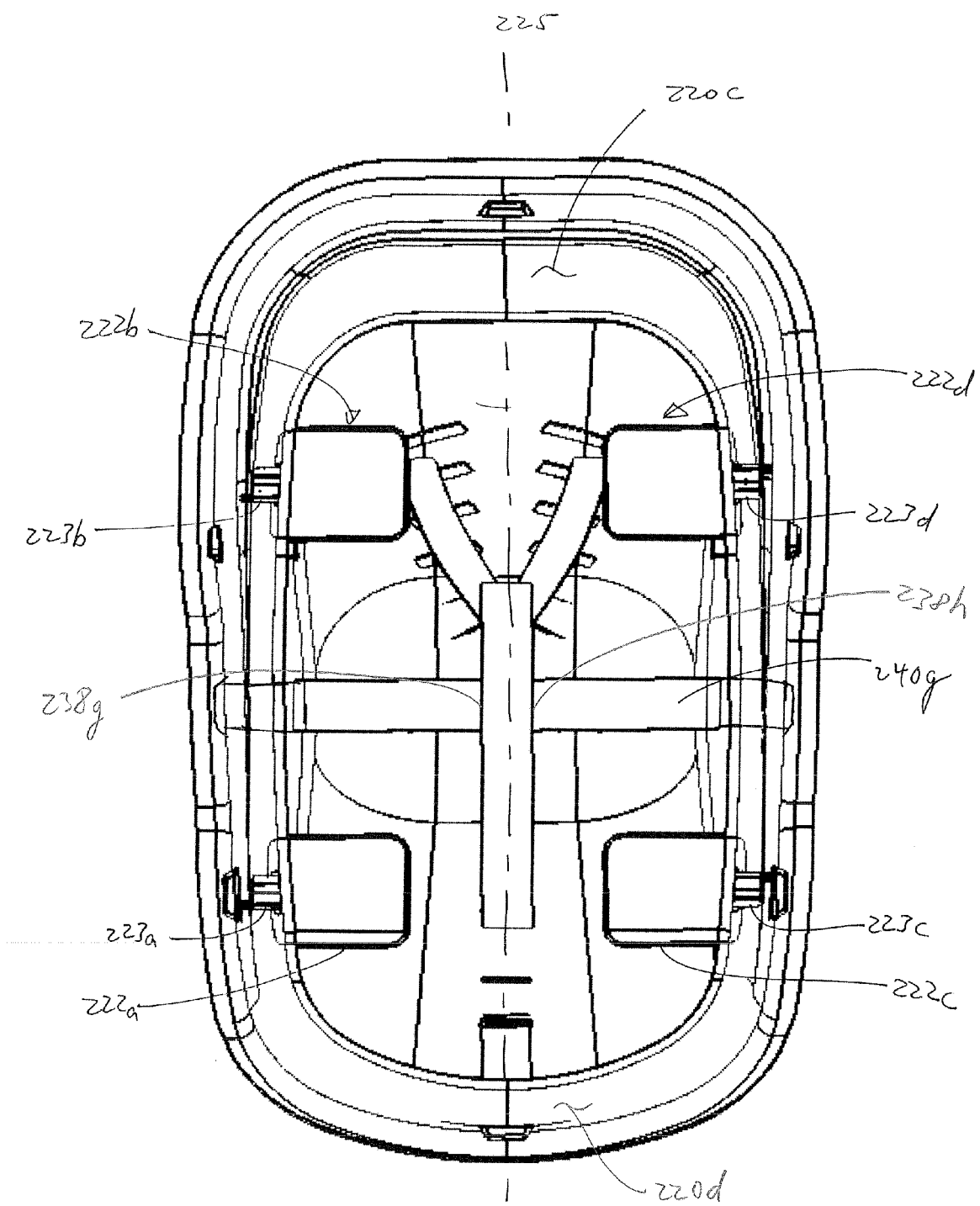
FIG. 8 is a view of the bottom of the car seat shown in FIG. 7.
Figure 9:
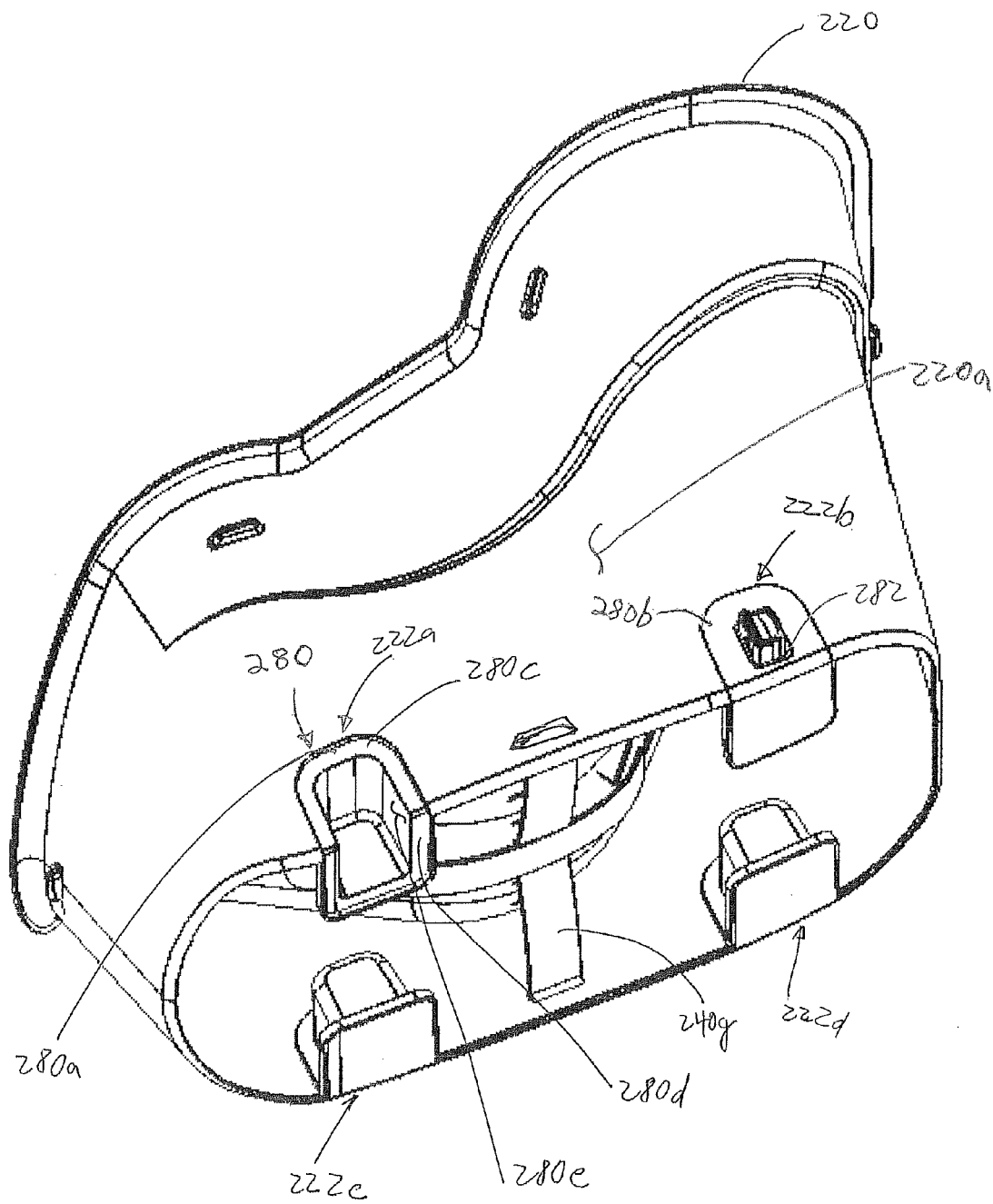
FIG. 9 is a perspective view of the side and bottom of the outer shell of the car seat shown in FIG. 7 with a tether connector in one anchor box.

As shown in FIGS. 7 and 8, side wall 220a defines fore and aft anchor boxes 222a and 222b for receiving corresponding tether connectors 223a and 223b, while side wall 220b defines fore and aft anchor boxes 222c and 222d for receiving corresponding tether connectors 223c and 223d, thereby permitting the car seat 210 to be connected to the vehicle in either a forward-facing or a rear-facing orientation. The tether connectors 223a-223d can be LATCH or ISOFIX connectors, which are well known. The anchor boxes 222a-222d are generally located proximate to the "corners" of the outer shell 220 as shown in FIGS. 7 and 8. Though not shown in FIG. 8, optional anchor boxes can be located in the front wall 220d and/or the back wall 220c.

As shown in FIG. 8, anchor boxes 222a-222d receive respective tether connectors 223a-223d (e.g., LATCH or ISOFIX connectors) in a direction that is at an angle with respect to a longitudinal axis 225 of the car seat 210. Specifically, in the embodiment shown in FIG. 8, the tether connectors 223a-223d extend substantially perpendicular to the longitudinal axis 225.

In one embodiment anchor boxes 222a-222d are constructed exactly the same and, therefore, to simplify the following discussion only a description of anchor box 222a will be given as representative of the other anchor boxes 222b-222d. Likewise, in one embodiment the tether connectors 223a-223d are constructed exactly the same and, therefore, to simplify the following discussion only a description of tether connector 223a will be given as representative of the other tether connectors 223b-223d.

The construction of anchor box 222a is best understood with reference to FIGS. 9 and 10A-10D. The anchor box 222a includes a housing 280 (FIGS. 9, 10A, 10C), a sleeve 282 (FIG. 10C) coupled to the housing 280 with a pin 284 (FIGS. 10C, 10D), and inserts 286 (FIGS. 10C and 10D) interposed between the housing 280 and the sleeve 282. The housing 280 includes a base 280a and a cover 280b which attach together, although the cover 280b (as well as the sleeve 282, pin 284, and inserts 286) of anchor box 222a is shown removed in FIG. 9 for illustrative purposes. The base 280a has an outer flange 280c (FIGS. 10C and 10D) that surrounds a cutout formed along the bottom edge of side 220a. The base 280a has an inner portion 280d (FIGS. 10C and 10D) that extends inward from the outer flange 280c at an angle with respect to axis 225, and in one embodiment in a direction generally perpendicular to axis 225. The inner portion 280d defines a channel 280e (FIGS. 10C and 10D) rectangular in cross-section, in which the sleeve 282, the pin 284, and inserts 286 are disposed. In one embodiment the channel 280e has a square cross section having dimensions of about 2 inches by 2 inches. The base 280a may be integrally formed with wall 220a of the outer shell 220 or may be a separate piece that is attached to the wall 220a.

As shown in FIG. 10D, the sleeve 282 is pinned to the inner portion 280d by pin 284 and is spaced from the surface of the channel 280e by inserts 286 (286a-286c). Pin 284 extends through sleeve 282 and through sides of inner portion 280d in a direction parallel to the axis 225. The sleeve 282 is constructed to receive tether connector 223a. The portion of pin 284 inside the sleeve 282 is constructed to permit a latch mechanism of tether connector 223a to attach to the pin 284 when the tether connector 223a is fully inserted into the housing 280. Preferably, the tether connector 223a is removably attachable to the pin 284. Such removably attachable tether connectors 223 are well known and include LATCH and ISOFIX connectors.

The inserts 286 shown in the embodiment of FIGS. 10C and 10D are generally ring-like, having an inner surface that surrounds and contacts the outer surface of sleeve 282 and having an outer surface that contacts the wall of channel 280e. In the embodiment shown in FIGS. 10C and 10D the inner and outer surfaces of the inserts 286 define a square profile corresponding to the square profiles of the sleeve 282 and the channel 280e. It is to be understood, however, that the inserts 286 may have other profiles to conform to the geometries of the sleeve 282 and channel 280e. For example, in one alternate embodiment shown in FIG. 10E, an anchor box 322a in wall 220a includes a housing 380 having an outer cover 380b connected to an inner portion 380a. The inner portion 380a defines a channel 380e which is tapered inwardly from the side of the outer shell 220 (not shown) and is trapezoidal in cross-section. Each insert 386a-386c in FIG. 10E has an outer surface that is tapered to conform to the tapered profile of channel 380e. Thus, it is to be understood that all of the inserts 386a-386c may have different profiles and dimensions based on their relative position along sleeve 382 within the anchor box 322a. Moreover, instead of a plurality of separate, spaced-apart inserts 386a-386c, a unitary elongated insert (not shown) may be employed which occupies some or all of the space between sleeve 282 (382) and channel 280e (380e). For example, such the unitary elongated insert may take the form of a sleeve or jacket in which sleeve 282 (382) is received and which has openings for pin 284 (384). In one embodiment, the inserts 286 (386) are formed of a compressible material, such as a foam. More specifically, in one embodiment inserts 286 (386) are formed of a foam having a density between 580 pounds per square inch and 2,900 pounds per square inch, manufactured by Sorbothane Inc. of Kent, Ohio.

Although the sleeve 282 (382) is coupled to the housing 280 (380) by pin 284 (384), the sleeve 282 (382) has some freedom of motion relative to the housing 280 (380). The sleeve 282 (382) can rotate and translate longitudinally about an axis along pin 284 (384). In addition, the sleeve 282 (382) can rotate about an axis 287 (FIG. 10D) (387, FIG. 10E) through and perpendicular to the axis along pin 284 (384). Such motion about axis 287 (387) can be accomplished by forming through holes in sleeve 282 (382) (through which pin 284 (384) extends) slightly larger than the outer diameter of pin 284 (384).

The relative movement of sleeve 282 (382) with respect to housing 280 (380) is limited by the inserts 286a-286c (386a-386c), which are constructed to compress or expand in response to the relative movement between the sleeve 282 (382) and the housing 280 (380). The relative movement between the sleeve 282 (382) and the housing 280 (380) occurs as a result of force and torque transmitted by the tether connector 223a to the sleeve 282 (382) during impact of the vehicle, as discussed more fully below.

Figure 11:
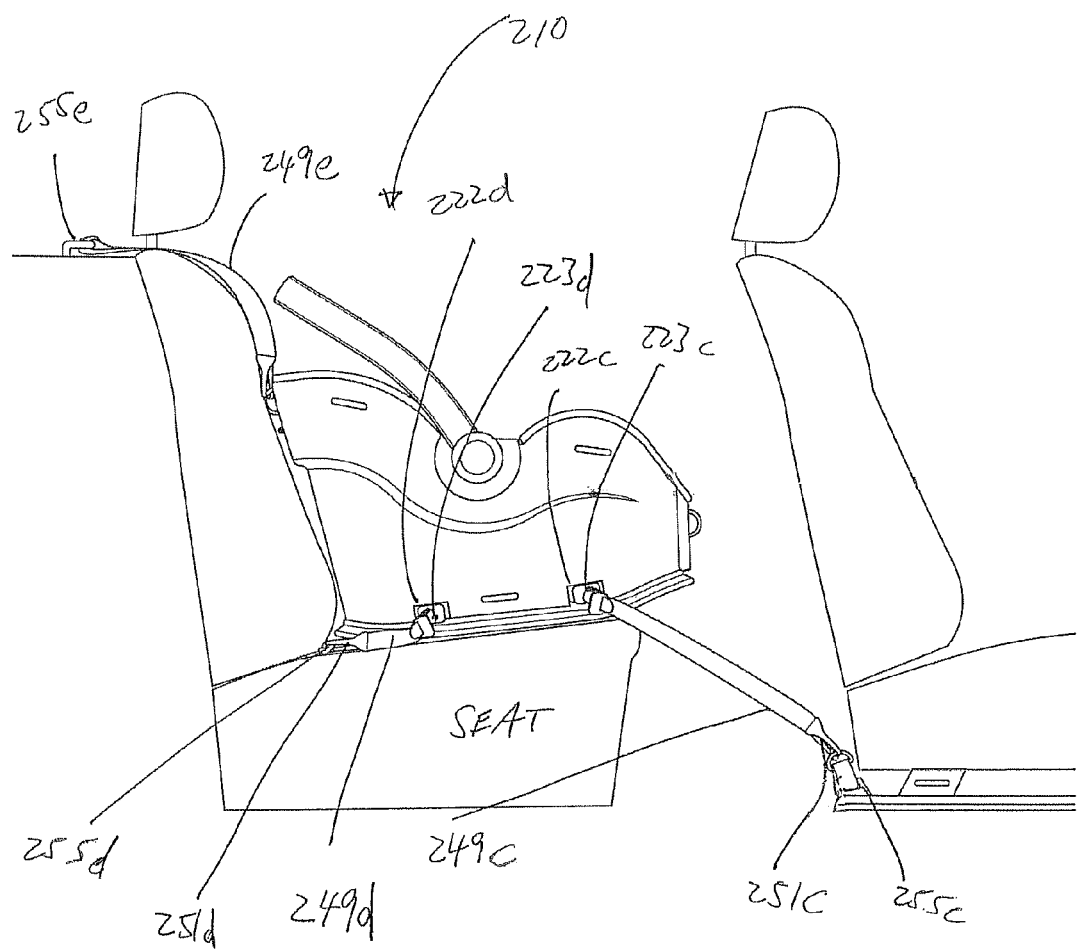
FIG. 11 is an elevation view of an embodiment of a car seat in a front facing orientation in a vehicle.
Figure 12:
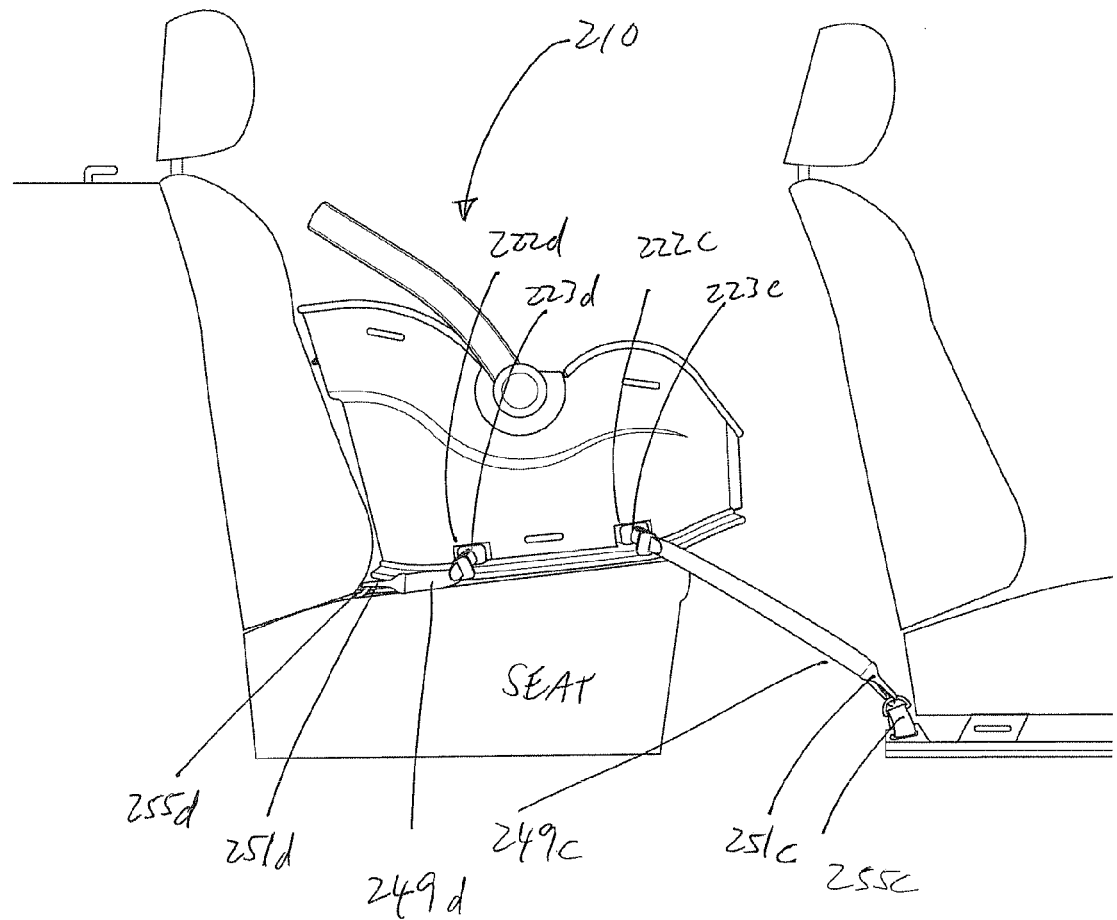
FIG. 12 is an elevation view of an embodiment of a car seat in a front facing orientation in a vehicle.

As shown in FIGS. 11 and 12, where the car seat 210 is placed in a forward-facing orientation in the vehicle, tether connectors 223c and 223d are connected, respectively to tether straps 249c and 249d, which also have second tether connectors 251c and 251d at opposite ends of the tether straps 249c and 249d for attachment to anchor points 255c and 255d of the vehicle. In one embodiment, the tether straps 249c and 249d are adjustable to facilitate vehicle installation. Preferably, tether connectors 251c and 251d are LATCH or ISOFIX connectors and anchor points 255c and 255d are LATCH or ISOFIX anchor points. In particular, anchor box 222c connects to a corresponding anchor point 255c of the vehicle located in front of the vehicle seat, and anchor boxes 222d connects to a corresponding anchor point 255d of the vehicle at the rear of the vehicle seat, such as at an intersecting location between the seat back and the seat bottom. While not shown in FIGS. 11 and 12, the connections of anchor boxes 222a and 222b to the vehicle would be mirror images to that shown in FIGS. 11 and 12. In addition, in the embodiment shown in FIG. 11, an upper tether strap 249e is connected between an upper anchor point 255e of the vehicle and the back side 220c of the outer shell 220.

Figure 13:
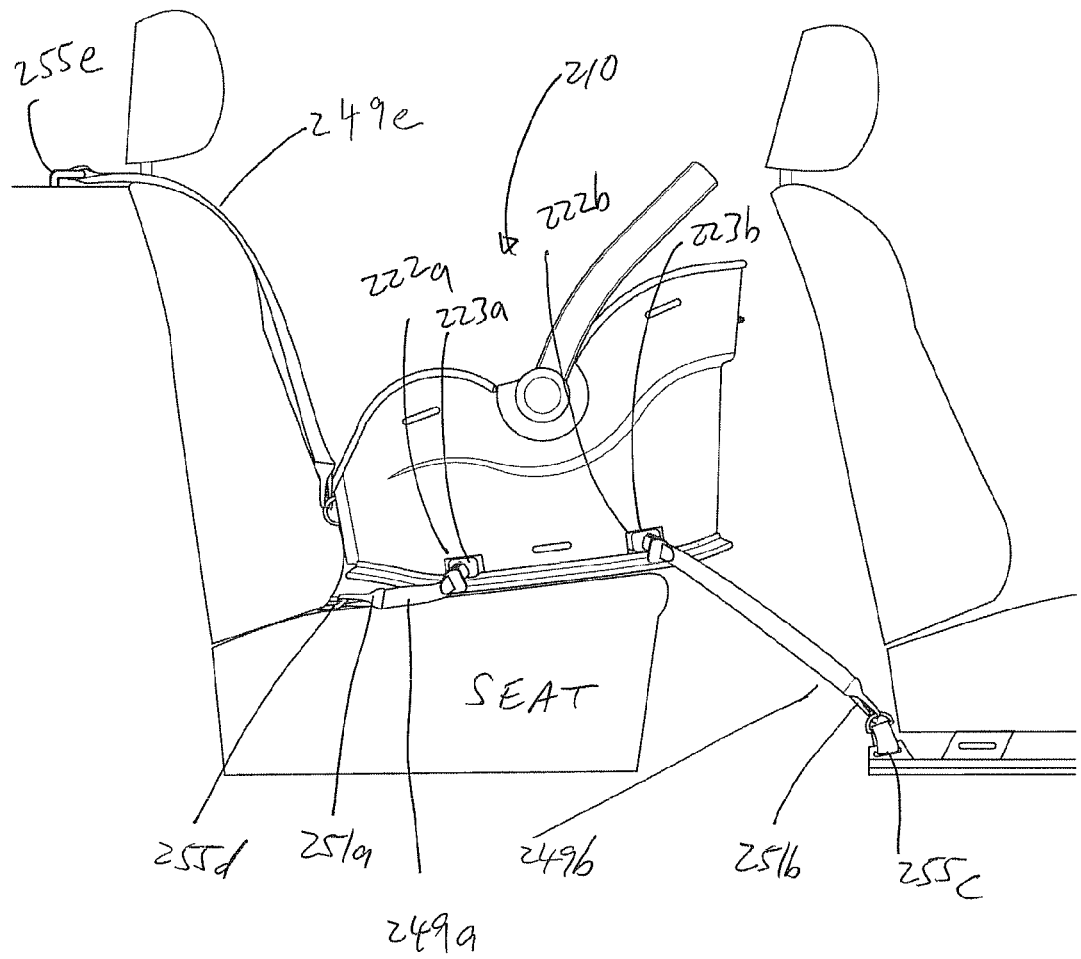
FIG. 13 is an elevation view of an embodiment of a car seat in a rear facing orientation in a vehicle.
Figure 14:
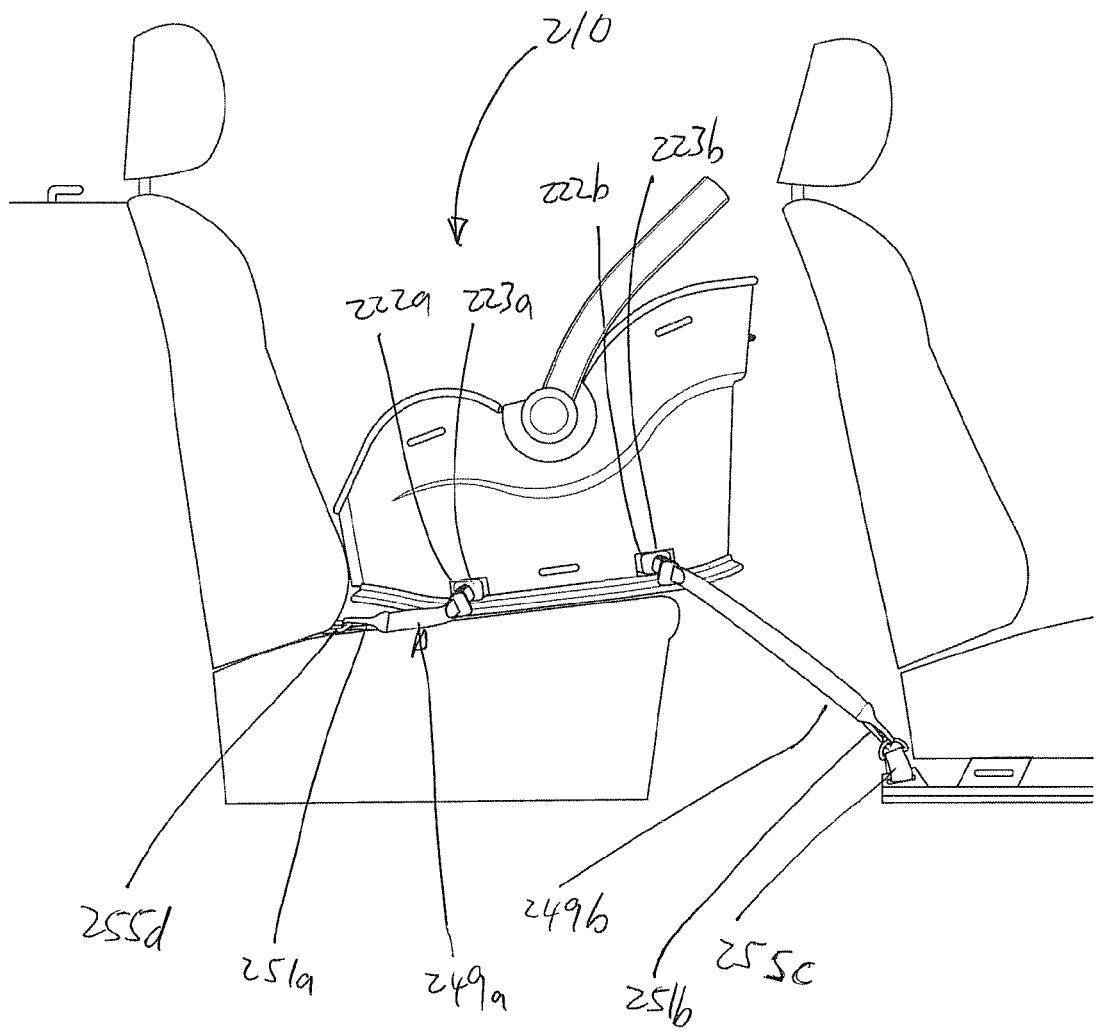
FIG. 14 is an elevation view of an embodiment of a car seat in a rear facing orientation in a vehicle.

As shown in FIGS. 13 and 14, where the car seat 210 is placed in a rear-facing orientation in the vehicle, tether connectors 223a and 223b are connected, respectively to tether straps 249a and 249b, which also, preferably, have second tether connectors 251a and 251b at opposite ends of the tether straps 249a and 249b for attachment to anchor points 255d and 255c of the vehicle. In one embodiment, the tether straps 249a and 249b are adjustable to facilitate vehicle installation. Preferably, tether connectors 251a and 251b are LATCH or ISOFIX connectors and anchor points 255d and 255c are LATCH or ISOFIX anchor points. In particular, anchor box 222b connects to a corresponding anchor point 255c of the vehicle located in front of the vehicle seat, and anchor box 222a connects to a corresponding anchor point 255d of the vehicle at the rear of the vehicle seat, such as at an intersecting location between the seat back and the seat bottom. While not shown in FIGS. 13 and 14, the connections of anchor boxes 222c and 222d to the vehicle would be mirror images to that shown in FIGS. 13 and 14. In addition, in the embodiment shown in FIG. 13, the upper tether strap 249e is connected between the upper anchor point 255e of the vehicle and the front side 220d of the outer shell 220.

When the anchor boxes 222a-222d are connected to the vehicle, as described above in connection with FIGS. 11 to 14, the aforementioned tether straps (e.g., 249a-249d) will extend generally parallel to the longitudinal axis 225 of the car seat 210. Therefore, for example, any load applied to anchor box 222a via tether connector 223a and strap 249a (FIG. 13) during impact is not applied in a direction along the longitudinal axis 225. Instead, owing to tether connector 223a (FIG. 13) extending at an angle relative to the longitudinal axis 225, the tether connector 223a creates a moment arm at which the load from impact will act to advantageously transmit a torque to anchor box 222a, as discussed more thoroughly below.

Anchor box 222a is intentionally structurally inefficient so that it can absorb the force and torque from the tether connector 223a during impact of the vehicle. Referring back to FIGS. 10D and 10E, the inserts 286a-286c (386a-386c) are constructed to absorb at least some of the energy transmitted through the tether straps to the car seat 210 during impact. Specifically, when the tether strap 249a extends parallel to the longitudinal axis 225 of the seat 210, as shown in FIGS. 13 and 14, and the force in the tether strap 249a is applied through the tether connector 223a, the tether connector 223a in the sleeve 282 (382) will exert a moment on sleeve 282 (382) about axis 287 (387). The moment applied to sleeve 282 (382) will tend to rotate the sleeve 282 (382) about the axis 287 (387), which will tend to compress the inserts 286a-286c (386a-386c) against the channel 280e (380e), thereby absorbing some of the energy from the impact. Moreover, in the alternate embodiment shown in FIG. 10E, the width of insert 386a is greater than insert 386b, which has a width greater than insert 386c. In comparison to the arrangement of sleeve 282 about axis 287 shown in FIG. 10D, the arrangement shown in FIG. 10E allows more rotation of sleeve 382 about axis 387 and therefore absorbs more energy for the same amount of insert material. In addition, to further absorb energy from the impact, the moment exerted on the sleeve 282 (382) will also be partially transmitted through the pin 284 (384) and the base 280a (380a) of the housing 280 (380) to the side 220a of the outer shell 220. Owing to the energy absorbed by inserts 286a-286c (386a-386c), the force exerted on the base 280a (380a) can be reduced. Consequently, the force exerted on side 220a and the deflection of the housing 280 (380) with respect to the side 220a can be reduced. Thus, the construction and orientation of anchor box 222a (323a) reduces the amount of energy transmitted to the outer shell 220 and, therefore, to the occupant of the car seat 210.

As shown in FIG. 15, shell 220 also defines a series of eight slots 224a-224h for receiving seven belts 240a-240g of the suspension system 240. Seven slots are provided, including three slots each in side walls 220a, 220b, a single slot in the front wall 220d of the car seat, and a single slot in the top of the back wall 220c. Belts 240a-240g couple the outer shell 220 to the inner seat 230.

The inner seat 230 is scooped in shape with a relatively high back, a deep seat area (for the buttocks), and a slightly rising surface for the thighs and legs. The inner seat 230 is a protective seat made from a multi-layered construction which is identical to seat 30, described above. The inner seat 230 also defines a plurality of (e.g., eight) slots 238a-238f (FIG. 15), 238g (FIG. 8), and 238h (FIG. 8) for receiving the belts 240a-240f (FIG. 15) and 240g (FIG. 8) of the suspension system 240, and a series of slots 239 for receiving belt(s) 252 of the harness system 250. The hard outer shell 232 of inner seat 230 may be formed from the same materials discussed above with reference to shell 32 of FIGS. 1-5.

The suspension system 240 functions to suspend the inner seat 230 relative to the outer shell 220 and to thereby act as a shock isolator between the shell 220 and the seat 230. The suspension system 240 is a seven-point suspension system with seven webs or belts (six shown 240a-240f in FIG. 15 and one shown 240g in FIG. 8). The belts 240a-240g may be configured and formed as described below.

In the embodiment shown in FIGS. 8 and 15, all of the belts 240a-240g share the same construction. Accordingly, to simplify the discussion, a description of belt 240a is provided below as representative of the construction and function of all of the belts 240a-240g.

Figure 16:
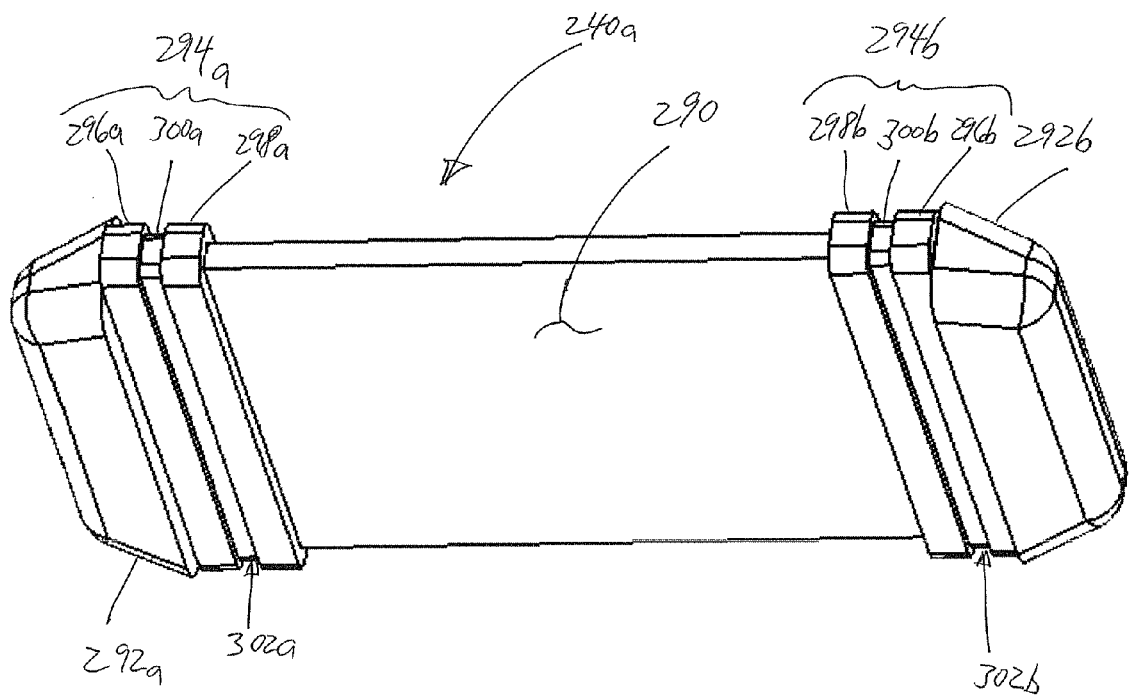
FIG. 16 is a perspective view of a strap of the car seat shown in FIG. 15.

As shown in FIG. 16, belt 240a includes a generally flat web or strap 290. The strap includes ends 292a and 292b. Ends 292a and 292b are tapered outwardly so that they have a thinner profile at their outer sides than at their inner sides. Ends 292a and 292b can be formed from various materials including, but not limited to, ABS, plastic, webbing such as car seatbelt webbing, and ULTEM® 292a, 292b, or similar material. Belt 240a also includes two washers 294a and 294b located between the ends 292a and 292b. The ends 292a and 292b are relatively thicker than the washers 294a and 294b and the strap 290. The ends 292a and 292b retain the washers 294a and 294b on the strap 290. End 292a is constructed to be received through slot 224a in outer shell 220 while end 292b is constructed to be received through slot 238a in inner seat 230.

Washers 294a and 294b are formed of a compressible material, such as a foam manufactured by Sorbothane Inc. of Kent, Ohio. Washer 294a has an outer flange 296a, an inner flange 298a, and a web 300a connecting between the outer flange 296a and the inner flange 298a. A groove 302a is defined between the outer flange 296a, the inner flange 298a, and the web 300a. Groove 302a is formed around the periphery of the washer 294a. The washer 294a is constructed to be received in opening 224a of shell 220. The groove 302a is constructed so that the edge that defines opening 224a is seated in the groove 302a so that the shell 220 is sandwiched between the outer flange 296a and the inner flange 298a of the washer 294a. With the washer 294a so seated in the shell 220, relative movement of the washer 294a, such as due to movement of the strap 290 during impact of the vehicle, can cause compression and/or tension on the flanges 296a and 298a and the web 300a to absorb some of the energy imparted to the strap 290. For example, during an impact of the vehicle to which the car seat 210 is attached, tension in strap 290 can cause end 292a to contact and apply pressure to outer flange 296a of washer 294a, which will compress the outer flange 296a against the outer side of shell 220, thereby absorbing some of the energy of the impact.

Washer 294b has an outer flange 296b, an inner flange 298b, and a web 300b connecting between the inner and outer flanges. A groove 302b is defined between the outer flange 296b, the inner flange 298b, and the web 300b. Groove 302b is formed around the periphery of the washer 294b. The washer 294b is constructed to be received in opening 238a of inner seat 230. The groove 302b is constructed so that the edge that defines opening 238a is seated in the groove 302b so that the inner seat 230 is sandwiched between the outer flange 296b and the inner flange 298b of the washer 294b. With the washer 294b so seated in inner seat 230, relative movement of the washer 294b, such as due to movement of the strap 290 during impact of the vehicle, can cause compression and/or tension on the flanges 296b and 298b and the web 300b to absorb some of the energy imparted to the strap 290. For example, during an impact of the vehicle to which the car seat 210 is attached, tension in strap 290 can cause end 292b to contact and apply pressure to outer flange 296b of washer 294b, which will compress the outer flange 296b against the side of inner seat 230, thereby absorbing some of the energy of the impact.

The harness 250 is the same as harness 50, described above and, therefore, a description of harness 250 is omitted for sake of brevity.

Figure 17:
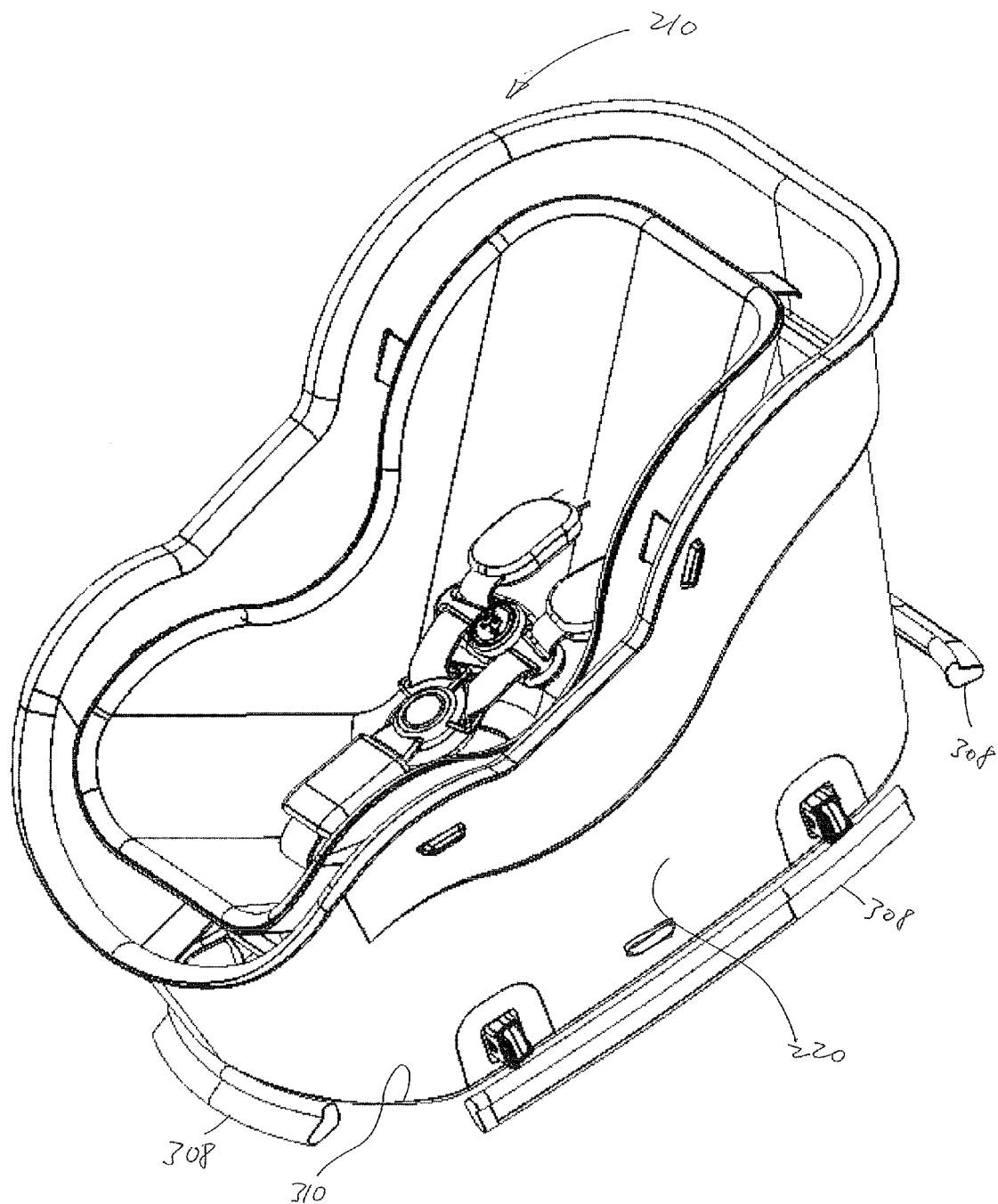
FIG. 17 is an exploded assembly view of the car seat shown in FIG. 7 and an optional compressible material.

FIG. 17 shows an exploded assembly view of the car seat 210 with optional compressible material 308, such as foam, constructed for attachment to the bottom side of outer shell 220. The compressible material 308 is attached to the bottom edge 310 of the outer shell 220 and acts to provide additional shock absorbency between the outer shell 220 and the vehicle seat (not shown). In one embodiment, the foam is about 1 inch thick when uncompressed. The foam can be made from various materials including, but not limited to Poron XRD foam (manufactured by Rogers Corporation of Rogers, Conn.) or similar materials.

Thus, it will be appreciated that the various embodiments of car seats described above employ layered shock absorbing/isolating arrangements, which together, act as a shock absorber/isolation system that can reduce the forces exerted on an occupant of the car seat during a vehicle collision. The outer shell is of extremely high strength and will remain structurally intact in almost all circumstances thereby further protecting the occupant of the car seat.

There have been described and illustrated herein several embodiments of a car seat. While particular embodiments have been described, it is not intended that the claims be limited thereto, as it is intended that the claims be as broad in scope as the art will allow and that the specification be read likewise. Thus, while particular materials for shell have been disclosed, it will be appreciated that other materials may be used as well provided they supply sufficient strength for the suspension system and structural integrity for the system. Similarly, while particular types of materials have been disclosed for the inner seat layers, it will be understood that other materials can be used. Further, while the suspension system has been described as being comprised of belts or webs, it will be appreciated that other or additional suspension elements may be utilized. It will therefore be appreciated by those skilled in the art that yet other modifications could be made without deviating from the spirit and scope of the claims.

What is claimed is:

1. A car seat for an occupant, comprising:
an outer protective shell;
an inner seat coupled to the outer protective shell; and
a plurality of anchor boxes formed in the outer protective shell for coupling to corresponding connectors, each anchor box defining a receptacle configured to receive the connector in a direction along an axis extending at an angle with respect to a plane bisecting the outer protective shell and the inner seat, wherein the angle is greater than 0 degrees and less than 180 degrees.

2. A car seat according to claim 1, further comprising:
a harness adapted to hold the occupant in the inner seat.

3. A car seat according to claim 1, wherein:
said axis extends perpendicular to said plane.

4. A car seat according to claim 1, wherein:
said anchor boxes each are constructed to receive and attach to at least one of a LATCH connector and an ISOFIX connector.

5. A car seat according to claim 1, wherein:
said anchor boxes each include a housing, a sleeve coupled to the housing, and at least one insert interposed between said sleeve and said housing.

6. A car seat according to claim 5, wherein:
at least one insert is formed of a compressible material.

7. A car seat according to claim 6, wherein:
compressible material includes foam.

8. A car seat according to claim 5, wherein:
said at least one insert has a first cross-sectional area at a first location relative to said axis and a second cross-sectional area different than said first cross-sectional area at a second location removed from said first location relative to said axis.

9. A car seat according to claim 5, wherein:
said at least one insert comprises a plurality of inserts.

10. A car seat according to claim 1, further comprising:
a suspension system coupled to said inner seat and to said outer protective shell, said suspension system suspending the inner seat substantially within the outer protective shell and permitting relative movement therebetween and shock-isolating said inner seat from said outer protective shell.

11. A car seat system for removably coupling a car seat to a vehicle having at least one car seat anchor, the system comprising:
said car seat of claim 1; and
a tether strap having a first connector at a first end of said tether strap and having a second connector at a second end of said tether strap,
wherein said first connector is removably attached to the at least one car seat anchor of the vehicle and said second connector is removably attached to the at least one anchor box of the car seat.

12. A car seat system according to claim 11, wherein:
said car seat includes a shock isolation apparatus coupling the inner seat and said outer protective shell and permitting relative movement therebetween, and a harness adapted to hold the occupant in the inner seat and not attached to the outer protective shell.

13. A car seat shock isolation system for a car seat having a wall and connected to a vehicle, the system including:
a shock absorbing washer seated at least partly inside the wall of the car seat and
a strap extending through said washer and through the wall of the car seat, said strap coupled to the car seat, said strap having an end portion adjacent to said washer that is constructed to apply pressure to said washer in response to movement of said strap.

14. A car seat shock isolation system according to claim 13, wherein:
said washer has an inner flange disposed on an inner side of the wall of the car seat, an outer flange disposed on an outer side of the wall of the car seat, and a web extending between the inner flange and the outer flange, wherein the end portion of the strap is adjacent to the outer flange.

15. A car seat shock isolation system according to claim 14, wherein:
said washer is formed of foam.

* * * * *